US010155556B2

(12) United States Patent
Chiba et al.

(10) Patent No.: US 10,155,556 B2
(45) Date of Patent: Dec. 18, 2018

(54) CUSHIONING-MATERIAL STRUCTURE FOR VEHICLE SEAT

(71) Applicant: TS TECH CO., LTD., Asaka-shi, Saitama (JP)

(72) Inventors: Tomohisa Chiba, Tochigi (JP); Katsuhiro Kiya, Tochigi (JP); Yoshinori Ueyama, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 15/722,577

(22) Filed: Oct. 2, 2017

(65) Prior Publication Data

US 2018/0037284 A1     Feb. 8, 2018

Related U.S. Application Data

(63) Continuation of application No. 14/409,864, filed as application No. PCT/JP2013/067606 on Jun. 27, 2013, now Pat. No. 9,821,868.

(30) Foreign Application Priority Data

Jun. 28, 2012   (JP) ................................ 2012-145333
May 27, 2013   (JP) ................................ 2013-110495
(Continued)

(51) Int. Cl.
    *B60N 2/40*        (2006.01)
    *B62J 1/12*         (2006.01)
    (Continued)

(52) U.S. Cl.
    CPC *B62J 1/18* (2013.01); *B60N 2/40* (2013.01); *B62J 1/12* (2013.01); *B62J 1/26* (2013.01); *B63B 2029/043* (2013.01)

(58) Field of Classification Search
CPC ....... B62J 1/18; B62J 1/26; B62J 1/12; B60N 2/40; B63B 2029/043; B60J 1/00
(Continued)

(56) References Cited

U.S. PATENT DOCUMENTS 2,324,976 A    7/1943   Soper
3,331,089 A    7/1967   Omas et al.
(Continued)

FOREIGN PATENT DOCUMENTS

JP      S07-13592 U    10/1932
JP      S31-17559 U    10/1956
(Continued)

OTHER PUBLICATIONS

Dec. 31, 2014 International Preliminary Report on Patentability issued in International Application No. PCT/JP2013/067606.
(Continued)

*Primary Examiner* — Brian D Mattei
(74) *Attorney, Agent, or Firm* — Oliff PLC

(57) ABSTRACT

The purpose of the present invention is to provide a cushioning material structure, for a vehicle seat, that makes it possible to reduce the weight of the vehicle seat while maintaining stable riding performance. A cushioning material supported by the top surface of a bottom plate provided on a vehicle body is provided with voids. This allows weight reduction without reducing the thickness of the cushioning material as in conventional cushioning-material structures, thereby making it possible to reduce the weight of the vehicle seat while maintaining stable riding performance.

3 Claims, 26 Drawing Sheets

(30) Foreign Application Priority Data

May 27, 2013 (JP) ................................ 2013-110501
May 27, 2013 (JP) ................................ 2013-110503

(51) Int. Cl.
*B62J 1/18* (2006.01)
*B62J 1/26* (2006.01)
*B63B 29/04* (2006.01)

(58) Field of Classification Search
USPC .................................. 297/214, 243, 452.15
See application file for complete search history.

(56) References Cited

U.S. PATENT DOCUMENTS

| | | | |
|---|---|---|---|
| 4,026,600 A | 5/1977 | Kutaguchi | |
| 4,451,083 A | 5/1984 | Marchello | |
| 4,691,963 A | 9/1987 | Mikuniya et al. | |
| 4,961,609 A | 10/1990 | Bigolin et al. | |
| 4,999,068 A | 3/1991 | Chiarella | |
| 5,108,076 A | 4/1992 | Chiarella | |
| 5,419,612 A | 5/1995 | Rassekhi | |
| 5,522,645 A | 6/1996 | Dahlbacka | |
| 5,645,315 A | 7/1997 | Walker et al. | |
| 6,070,896 A | 6/2000 | Saiki | |
| 6,131,994 A | 10/2000 | Yates | |
| 6,231,122 B1 | 5/2001 | Goldstein | |
| 6,345,865 B1 | 2/2002 | Ashida et al. | |
| 6,481,792 B1 | 11/2002 | Goin | |
| 6,860,551 B1 | 3/2005 | Chi | |
| 6,942,291 B2 | 9/2005 | Yu | |
| 7,159,936 B2 | 1/2007 | Bigolin et al. | |
| 7,448,664 B2 | 11/2008 | Karube et al. | |
| 7,572,498 B2 | 8/2009 | Bigolin | |
| 7,690,730 B2 | 4/2010 | Yasuda et al. | |
| 7,837,260 B2 | 11/2010 | Hein et al. | |
| 7,980,633 B2 | 7/2011 | Koyano et al. | |
| 9,334,004 B2 | 5/2016 | Kawatani et al. | |
| 9,821,868 B2* | 11/2017 | Chiba | B62J 1/18 |
| 2006/0048987 A1 | 3/2006 | Karube et al. | |
| 2007/0018488 A1 | 1/2007 | Hein et al. | |
| 2007/0120412 A1 | 5/2007 | Koyano et al. | |
| 2007/0141307 A1 | 6/2007 | Bigolin | |
| 2007/0257535 A1 | 11/2007 | Yasuda et al. | |
| 2011/0156453 A1 | 6/2011 | Matsushima | |
| 2011/0210597 A1 | 9/2011 | Takeuchi et al. | |
| 2012/0242118 A1 | 9/2012 | Kawatani et al. | |
| 2012/0242122 A1 | 9/2012 | Kawatani et al. | |
| 2013/0300178 A1 | 11/2013 | Murata et al. | |
| 2015/0175229 A1 | 6/2015 | Chiba et al. | |
| 2015/0183476 A1 | 7/2015 | Chiba et al. | |
| 2016/0101819 A1 | 4/2016 | Iwata | |

FOREIGN PATENT DOCUMENTS

| | | |
|---|---|---|
| JP | S32-13761 | 11/1957 |
| JP | S51-138307 U | 11/1976 |
| JP | S54-13310 Y2 | 6/1979 |
| JP | S58-68147 U | 5/1983 |
| JP | S59-106784 U | 7/1984 |
| JP | S60-113282 U | 7/1985 |
| JP | H02-11482 A | 1/1990 |
| JP | H10-167139 A | 6/1998 |
| JP | 2000-168419 A | 6/2000 |
| JP | 2002-096793 A | 4/2002 |
| JP | 2005-118323 A | 5/2005 |
| JP | 2006-69506 A | 3/2006 |
| JP | 2007-314021 A | 12/2007 |
| JP | 2011-131856 A | 7/2011 |
| JP | 2012-201240 A | 10/2012 |

OTHER PUBLICATIONS

Nov. 13, 2015 Office Action issued in Japanese Patent Application No. 2012-145333.
Apr. 27, 2016 Office Action issued in U.S. Appl. No. 14/409,190.
Jun. 14, 2016 Office Action issued in Japanese Patent Application No. 2012-145333.
Jan. 24, 2017 Office Action issued in Japanese patent application No. 2012-145333.
Mar. 21, 2017 Office Action issued in Japanese Patent Application No. 2013-110495.
Mar. 21, 2017 Office Action issued in Japanese Patent Application No. 2013-110501.
Mar. 21, 2017 Office Action issued in Japanese Patent Application No. 2013-110503.
Nov. 24, 2015 Office Action issued in Japanese Patent Application No. 2012-145333.
International Search Report issued in International Patent Application No. PCT/JP2013/067606 dated Oct. 1, 2013 (with translation).
Jul. 23, 2018 Office Action issued in U.S. Appl. No. 15/722,695.

* cited by examiner

CUSHIONING-MATERIAL STRUCTURE FOR VEHICLE SEAT

The present application is a continuation application of application Ser. No. 14/409,864 filed Dec. 19, 2014, which in turn is a U.S. national stage application of PCT/JP2013/067606 filed Jun. 27, 2013. The entire disclosures of the prior applications are incorporated herein by reference.

TECHNICAL FIELD

The present invention relates to a cushion material structure for a vehicle seat, such vehicle seat including seats of two wheeled vehicles such as motorcycles, scooters, snow mobiles and personal watercrafts, three wheeled buggies, straddle type vehicles and seats of construction machines.

BACKGROUND ART

As for vehicle seats of automatic two wheeled vehicles and the like, vehicle seats made by cushion materials being placed on bottom plates and being covered with surface material are known (for example, see Patent Document 1).

The cushion material described in Patent Document 1 is a solid material and the under surface thereof is formed in a shape that corresponds to the shape of the upper surface of the bottom plate, the under surface of the cushion material being tightly in contact with the upper surface of the bottom plate.

PRIOR ART DOCUMENTS

Patent Documents

Patent Document 1: Japanese Unexamined Patent Application Publication No. 2007-314021

DISCLOSURE OF INVENTION

Problems to be Solved by the Invention

In view of weight saving of the vehicle body, there has been a desire to make the vehicle seat lighter. As one method, there has been an idea of making the cushion material thinner, for example. However, the cushion material cannot bend easily if it is made thin, and there are problems that the cushion material may have trouble absorbing the vibration and the like caused by the unevenness of the roads and that the sitting condition is not comfortable.

An object of the present invention is to provide a cushion material structure of a vehicle seat which realizes weight saving in a vehicle seat while maintaining stable sitting.

Means for Solving the Problem

In order to solve the above problems, the invention of an embodiment is a cushion material structure of a vehicle seat, including a cushion material having a space section, wherein the cushion material is supported by an upper surface of a bottom plate which is provided on a vehicle body.

The invention of an embodiment is the cushion material structure, wherein the space section is formed at a back side of the cushion material and is a concave section opened toward the bottom plate.

The invention of an embodiment is the cushion material structure, wherein a plurality of concave sections are formed in the cushion material, and the plurality of concave sections are arranged along a width-wise center of the cushion material in a front-to-back direction of the cushion material.

The invention of an embodiment is the cushion material structure, wherein a plurality of mounting sections which are to be fixed to the vehicle body are arranged along an inner periphery at the back side of the bottom plate with spaces therebetween, and a plurality of other concave sections are formed in the cushion material between parts corresponding to positions of the plurality of mounting sections and the plurality of concave sections arranged along the width-wise center of the cushion material.

The invention of an embodiment is the cushion material structure, wherein the plurality of concave sections are arranged in a grid pattern.

The invention of an embodiment is the cushion material structure, wherein the cushion material further includes a pair of expected ischium sections as regions in the cushion material expected to correspond to an ischium position of a passenger, and the plurality of concave sections are arranged avoiding the pair of expected ischium sections.

The invention of an embodiment is the cushion material structure, wherein the bottom plate includes a reinforcement section which bulges at a back side of the bottom plate and which is recessed at an upper side of the bottom plate, and a reference surface is arranged so as to vertically face the reinforcement section.

The invention of an embodiment is the cushion material structure, wherein a length of a part in the reference surface corresponding to a straight line connecting centers of concave sections which are adjacent to each other in a left-to-right direction of the vehicle seat and a width of the reinforcement section are equal.

The invention of an embodiment is the cushion material structure, wherein a reference surface side periphery of a concave section arranged between the expected ischium sections which form the pair is supported by the bottom plate.

The invention of an embodiment is the cushion material structure, wherein concave sections are respectively arranged on the left and right of the concave section arranged between the expected ischium sections which form the pair, and only outside parts of reference surface side peripheries of the left and right concave sections are supported by the bottom plate.

The invention of an embodiment is the cushion material structure, wherein among the plurality of concave sections, one concave section and another concave section which is different from the one concave section are in communication with each other through the reinforcement section formed at the upper side of the bottom plate so as to be recessed.

The invention of an embodiment is the cushion material structure, wherein the cushion material is formed so as to bend at a part other than an upper layer part thereof.

The invention of an embodiment is the cushion material structure, wherein the cushion material is formed so as to bend at a lowest layer part thereof.

The invention of an embodiment is the cushion material structure, wherein the bottom plate includes a main surface section and a sub surface section which is arranged in front of the main surface section and which is tilted upward with respect to the main surface section, and at least one space section is formed in the cushion material at a part corresponding to a bent section between the main surface section and the sub surface section.

The invention of an embodiment is the cushion material structure, wherein wall sections which extend vertically are formed in the bottom plate so as to face each other at left and right on the bent section, the wall sections formed along the front-to-back direction.

The invention of an embodiment is the cushion material structure wherein an opening is formed in the bottom plate at a position facing the vehicle body, and a space section is formed in the cushion material at a position facing the opening.

Advantageous Effect of the Invention

According to an embodiment, since the cushion material is provided with the space section, the cushion material can be made lighter without making it thinner as in a conventional case. Thereby, the vehicle seat can be made lighter while maintaining a stable sitting.

According to an embodiment, the space section is formed on the back side of the cushion material and is a concave section opened toward the bottom plate. Therefore, the cushion material can bend toward the bottom plate easily when a passenger sits on the vehicle seat.

According to an embodiment, due to the plurality of concave sections arranged in a line, the width-wise center of the cushion material can bend easily in the front-to-back direction of the cushion material.

According to an embodiment, since the bottom plate is fixed to the vehicle body via the plurality of mounting sections, rigidity of the bottom plate itself can be improved. Further, since the plurality of concave sections can be formed in the cushion material within the range where rigidity of the bottom plate is improved by the plurality of mounting sections, the likeliness of bending in the cushion material can be improved more while stably supporting the cushion material with the bottom plate.

According to an embodiment, the plurality of concave sections can be lined neatly and efficiently within the back side range of the cushion material. Thus, a great number of concave sections can be formed.

According to an embodiment, since the plurality of concave sections are arranged avoiding the pair of expected ischium sections, reference surface is to be arranged at the positions of the pair of the expected ischium sections. Thus, the ischium position of a passenger can be supported stably.

According to an embodiment, when the cushion material is to bend, the cushion material can sink more downward than the reference surface by using the difference in level of the reinforcement section. Thus, the cushion material can bend easily.

According to an embodiment, the part in the reference surface corresponding to the straight line connecting the centers of concave sections which are adjacent to each other in the left-to-right direction of the vehicle seat is prevented from sinking in the recess of the reinforcement section, and the cushion material can be prevented from partially caving in.

According to an embodiment, the periphery of the concave section between the pair of expected ischium sections where a passenger load is likely to be applied is supported by the bottom plate. Thus, vicinity of the pair of expected ischium sections can be supported stably while maintaining the likeliness of bending at vicinity of the pair of expected ischium sections by the concave section.

According to an embodiment, by the outside parts of the reference surface side peripheries of the left and right concaves, the positions where the load is likely to be applied when the vehicle enters a curve can be supported. Thus, sitting can be stable when the vehicle enters a curve.

According to an embodiment, the air can be let out to another concave section from one concave section through the reinforcement section when the cushion material bends. Thus, the cushion material can bend more easily.

It has been said that, in general, a passenger can sit comfortably when he/she can feel the hardness to a certain extent in a vehicle seat of a two wheeled vehicle or the like. Therefore, as in an embodiment, if the cushion material is formed so as to bend at a part other than the upper layers thereof, the cushion material is not likely to bend in the upper layers thereof and the passenger can feel a certain level of hardness. On the other hand, since a part other than the upper layers of the cushion material is more likely to bend comparing to the upper layers, this part can absorb the vibration and the like caused by the unevenness of the road surface. Therefore, even if the cushion material is made thinner and the vehicle seat is made lighter, a stable sitting can be maintained.

According to an embodiment, since the cushion material is formed so as to bend at the lowest layer part thereof, the cushion material bends at the lowest layer part that is the furthest from the upper layer part. Thus, the upper layer part can be prevented from deforming with the bending of the lowest layer part and the sitting condition can be prevented from becoming uncomfortable due to bending.

In most cases, the bent section in the bottom plate between the main surface section and the sub surface section is where the buttocks of a passenger are to be placed. That is, if the cushioning properties at this section is improved, a passenger can sit more comfortably. As described in an embodiment, if at least one space section is formed at the bending part in the cushion material, the cushioning properties can be ensured by the space section even if the cushion material is made thin. Thus, a stable sitting can be maintained.

According to an embodiment, since the wall sections which extend vertically are formed at the left and right of the bottom plate on the bent section, the wall sections being formed along the front-to-back direction, rigidity at the bent section can be improved by the wall sections. If rigidity at the bent section in the front-to-back direction is improved, the bottom plate can be prevented from twisting, and thus, even more comfortable sitting condition can be provided.

In the bottom plate, openings through which the fixation member provided at the fuel tank of the vehicle body and the engaging section for positioning which is provided at the rear of the vehicle body are exposed are formed. Vicinity parts of these openings are not directly relevant to supporting the vehicle seat. Therefore, even if space sections are formed at the positions in the cushion material facing the openings, stability of the vehicle seat can be maintained and a stable sitting can also be maintained. Further, by forming the space sections, the vehicle seat can also be made lighter.

BEST MODE FOR CARRYING OUT THE INVENTION

First Embodiment

Hereinafter, the first embodiment of the present invention will be described with reference to the drawings.

Figure 1:
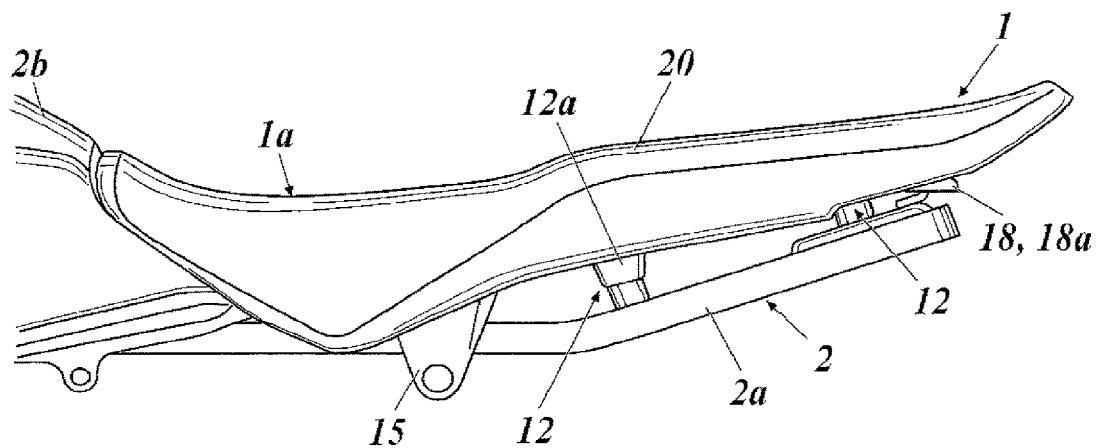
FIG. 1 is a side view of a vehicle seat according to the first embodiment.

In FIG. 1, the reference numeral 1 indicates a vehicle seat. The vehicle seat 1 of the embodiment is to be used in an automatic two wheeled vehicle.

Here, the vehicle seat is not limited to the seats used in automatic two wheeled vehicles as in the embodiment. The vehicle seat includes seats of two wheeled vehicles such as motorcycles, scooters, snowmobiles and personal watercrafts, three wheeled buggies, straddle type vehicles, seats of construction machines, four wheeled vehicles, etc.

The vehicle seat 1 includes a bottom plate 10 which is provided on a vehicle body 2 of an automatic two wheeled vehicle, a cushion material 20 which is supported by the upper surface of the bottom plate 10 and a surface material 3 which covers the bottom plate 10 and the cushion material 20. That is, the vehicle seat 1 is formed by the cushion material 20 being supported on the bottom plate 10 and the cushion material 20 and the bottom plate 10 being covered with the surface material 3.

The parts of the vehicle body 2 where the bottom plate 10 is to be fixed are, in particular, the seat rail 2a which is laid on the vehicle body 2 and the fuel tank 2b in front of the vehicle seat 1.

The bottom plate 10 is formed by a resin material such as polypropylene, polyvinylchloride, etc., and is formed in a shape corresponding to the shape of the vehicle body 2 of the automatic two wheeled vehicle. The bottom plate 10 is attached to the vehicle body 2.

The bottom plate 10 of the embodiment is formed by using polypropylene as a material, for example. In order to fixate the bottom plate 10 to the vehicle body 2 of the automatic two wheeled vehicle, the polypropylene is to be especially hard. The bottom plate 10 may be provided with clasps or the like necessary to be fixed to the vehicle body 2 of the automatic two wheeled vehicle.

The cushion material 20 is formed of a soft foam material such as, for example, urethane foam, polypropylene foam or polyethylene foam. As for the cushion material 20 of the embodiment, for example, urethane foam is used.

Since the cushion material 20 is supported by the upper surface of the bottom plate 10, the under surface of the cushion material 20 is formed in a shape reflecting the shape of the upper surface of the bottom plate 10. Thereby, the cushion material 20 can be supported stably by the upper surface of the bottom plate 10. The surfaces of the bottom plate 10 and the cushion material 20 which contact each other, that is, the upper surface of the bottom plate 10 and the under surface of the cushion material 20 are referred to as the reference surfaces 10a and 20a, respectively.

The cushion material 20 is formed so that the part in the upper surface thereof where a passenger who drives the automatic two wheeled vehicle sits is lower than the other portion when seen from a side. This part is referred to as the lowest position 1a that is the lowest along the width-wise center C2 of the vehicle seat 1 in the front-to-back direction of the vehicle seat 1. The part near the lowest position 1a corresponds to the ischium position of the passenger who drives the automatic two wheeled vehicle and is the maximum load section where a great portion of the load of a passenger is applied in the vehicle seat 1.

The surface material 3 constitutes the sitting surface of the vehicle seat 1. The surface material 3 is where comes in contact with a passenger and is formed by a resin material such as polypropylene, polyvinylchloride or the like. As for the surface material 3 of the embodiment, for example, a hard material made of polypropylene is used.

Figure 3:
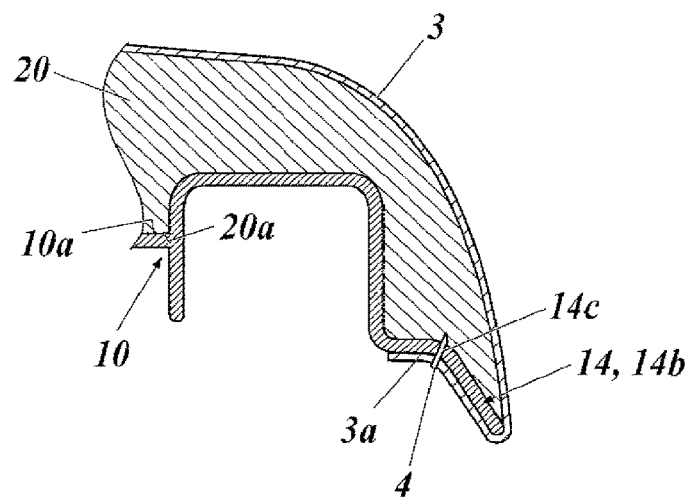
FIG. 3 is an enlarged cross-sectional view of a part of the vehicle seat according to the first embodiment.

As shown in FIG. 3, the edge 3a of the surface material 3 is folded in to the back side of the bottom plate 10 and is fixed to the back side of the bottom plate 10 by staples 4.

The edge 3a of the surface material 3 refers to the entire periphery edge of the surface material 3. Therefore, the edge 3a of the surface material 3 is fixed along the entire periphery edge of the bottom plate 10.

Next, the bottom plate 10 will be described in more detail.

The bottom plate 10 includes a plurality of reinforcement sections 11 which intersect with the width-wise center C1 of the bottom plate 10, at least a part of each reinforcement section being arranged obliquely with respect to the front-to-back direction of the vehicle seat as an oblique line. That is, the reinforcement sections 11 are not merely arranged vertically or horizontally (from front to rear or from side to side) in the bottom plate 10. By each of the reinforcement sections 11 including a part that is arranged obliquely, it is expected to obtain rigidity in the front-to-back direction and in the right-to-left direction.

Figure 2:
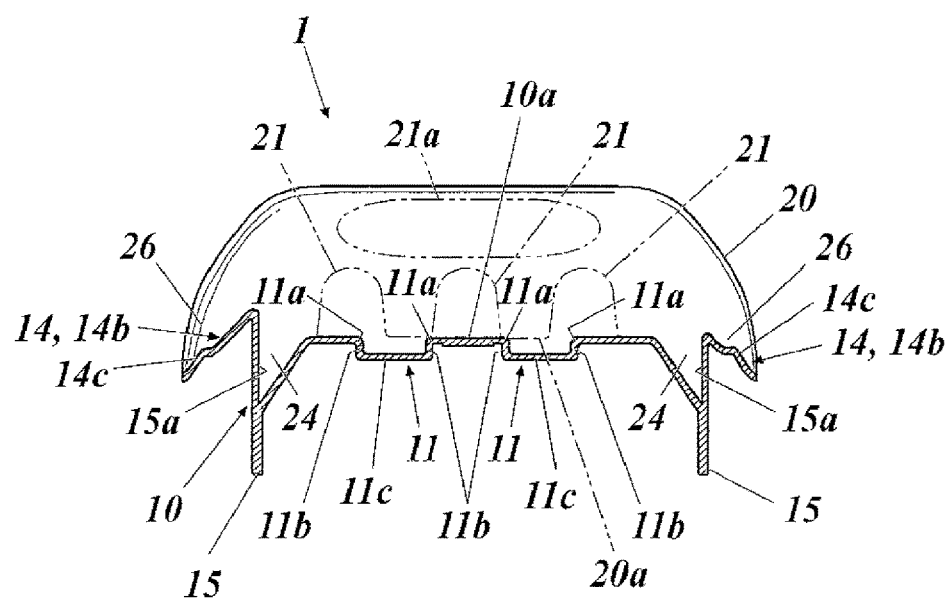
FIG. 2 is a cross-sectional view of the vehicle seat according to the first embodiment.
Figure 10:
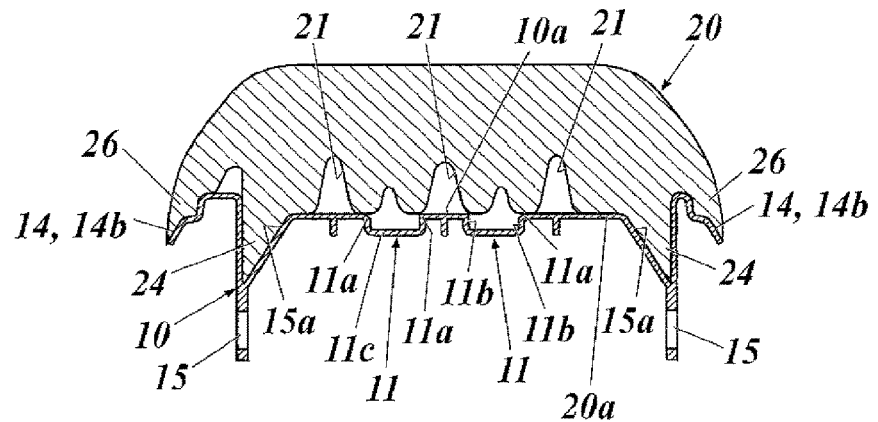
FIG. 10 is a cross-sectional view when cut along the line C-C shown in FIG. 7.
Figure 11:
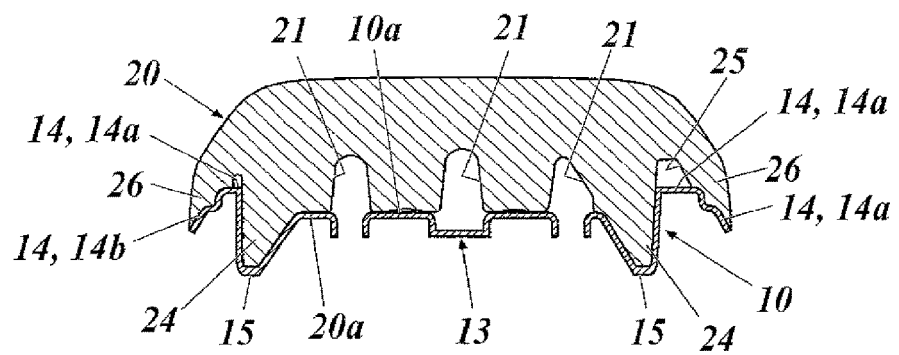
FIG. 11 is a cross-sectional view when cut along the line D-D shown in FIG. 7.
Figure 12:
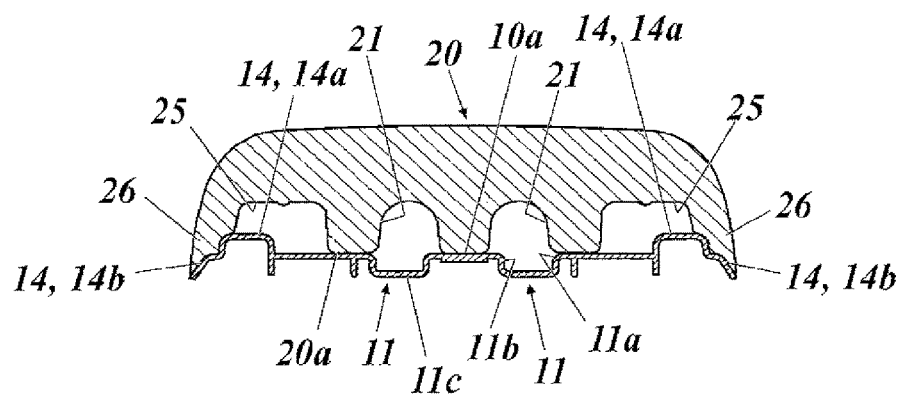
FIG. 12 is a cross-sectional view when cut along the line E-E shown in FIG. 7.
Figure 13:
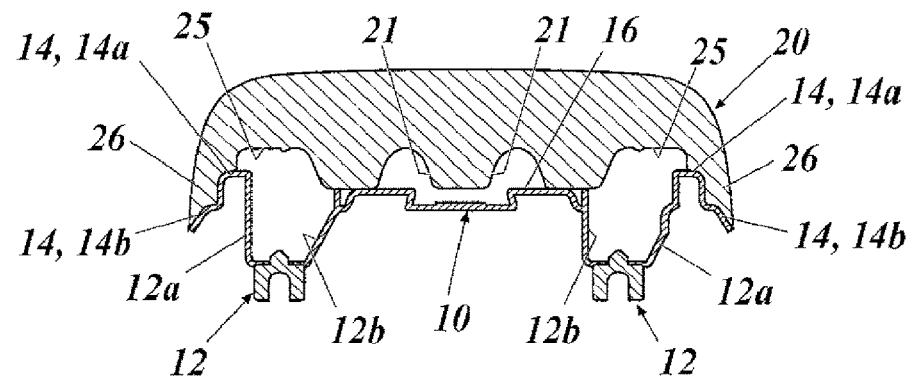
FIG. 13 is a cross-sectional view when cut along the line F-F shown in FIG. 7.
Figure 14:
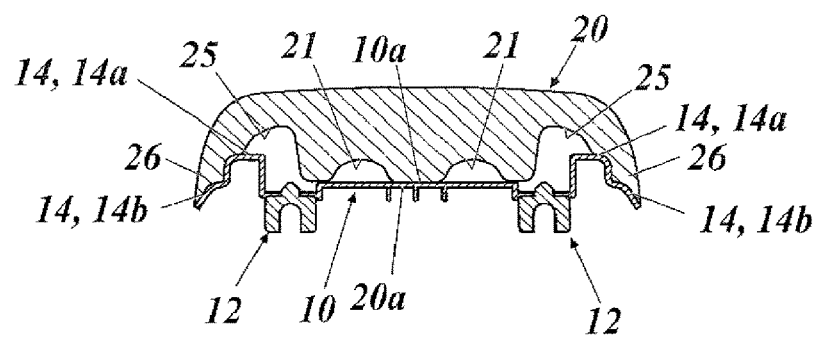
FIG. 14 is a cross-sectional view when cut along the line G-G shown in FIG. 7.
Figure 15:
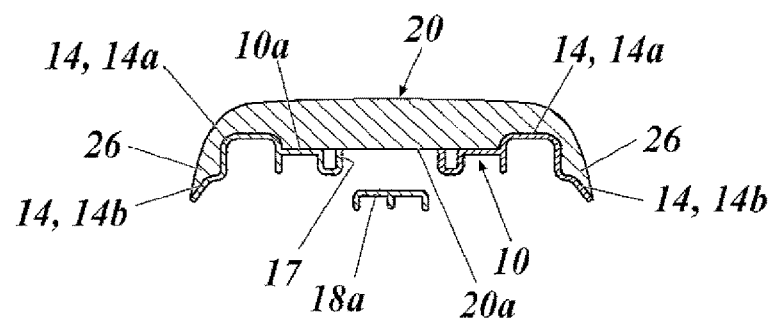
FIG. 15 is a cross-sectional view when cut along the line H-H shown in FIG. 7.

The reinforcement sections 11 of the embodiment bulge at the back side of the bottom plate 10 and are recessed at the upper side of the bottom plate 10. That is, as shown in FIGS. 2, 10, etc., each reinforcement section 11 is formed in a cross-sectional concave shape and includes a pair of side walls 11b and 11b each of which formed by being bent downward from the upper surface of the bottom plate 10 and the bottom which is formed in an integrated fashion being bridged between the lower edges of the side walls 11b and 11b that form a pair. Corners where the bottom plate 10 is turned downward from the upper surface thereof are referred to as turning sections 11a and are the parts in the reinforcement sections 11 having high rigidity.

The upper side of the bottom plate 10 includes the upper surface of the bottom plate 10 and the upper side of the step section 14b (described later) which is formed along the entire periphery edge of the bottom plate 10 and which is bent toward the vehicle body 2 more than the upper surface of the bottom plate 10. On the other hand, the back side of the bottom plate 10 is the back of the upper side of the bottom plate 10 and includes the under surface of the bottom plate 10 and the back side of the step section 14b.

According to the above described reinforcement sections 11, a concave-convex figure is formed in the bottom plate 10 leading to improvement in rigidity of the bottom plate 10. Further, since the bottom plate 10 can be reinforced in a state where the upper side thereof is partially recessed, bending of the cushion material 20 which is supported by the upper surface of the bottom late 10 is not inhibited comparing to a case where the bottom plate 10 is reinforced in a state where the upper side thereof is partially bulged. Therefore, a comfortable sitting condition can be provided to a passenger.

Although the reinforcement sections 11 are formed in a cross-sectional concave shape in the embodiment, this is not limitative in any way. The reinforcement sections 11 may be formed in a protruding shape such as a rib on the back side of the bottom plate 10.

Figure 4:
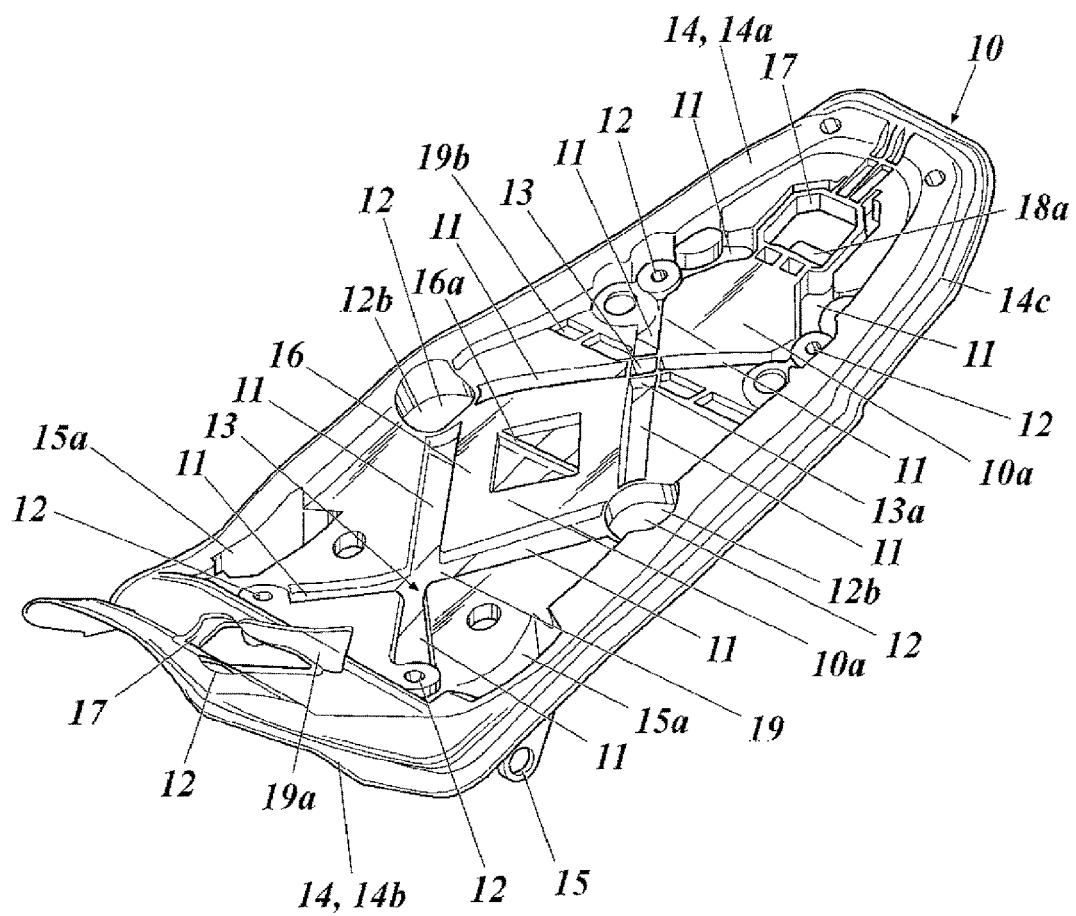
FIG. 4 is a schematic view of a bottom plate according to the first embodiment.
Figure 5:
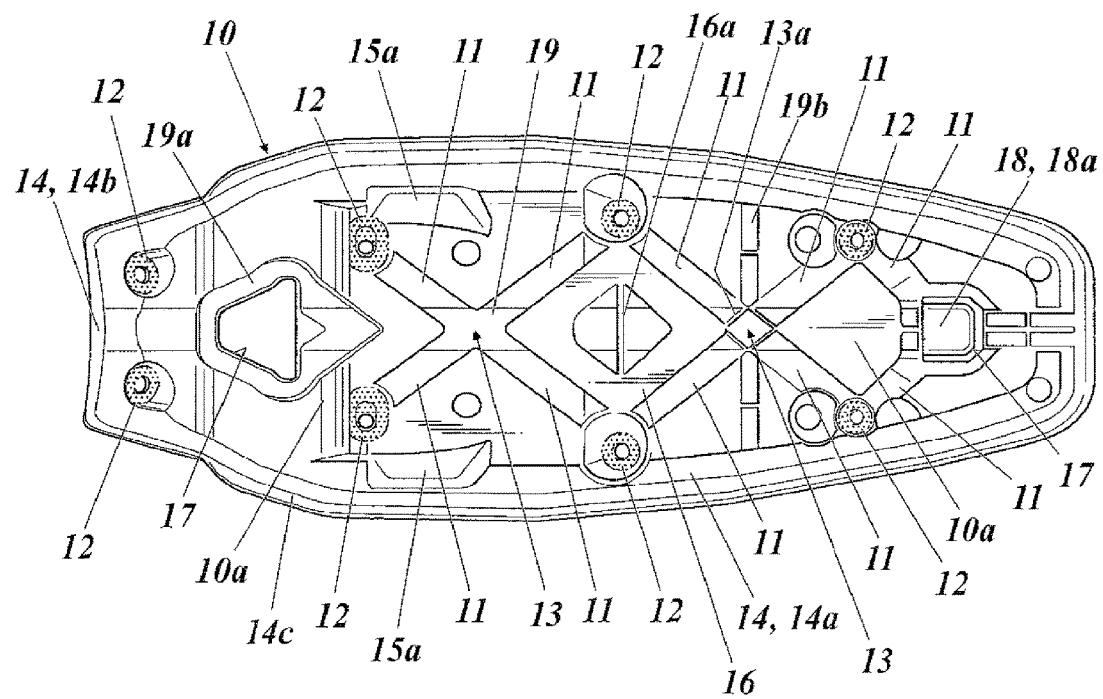
FIG. 5 is a plan view of the bottom plate according to the first embodiment.
Figure 7:
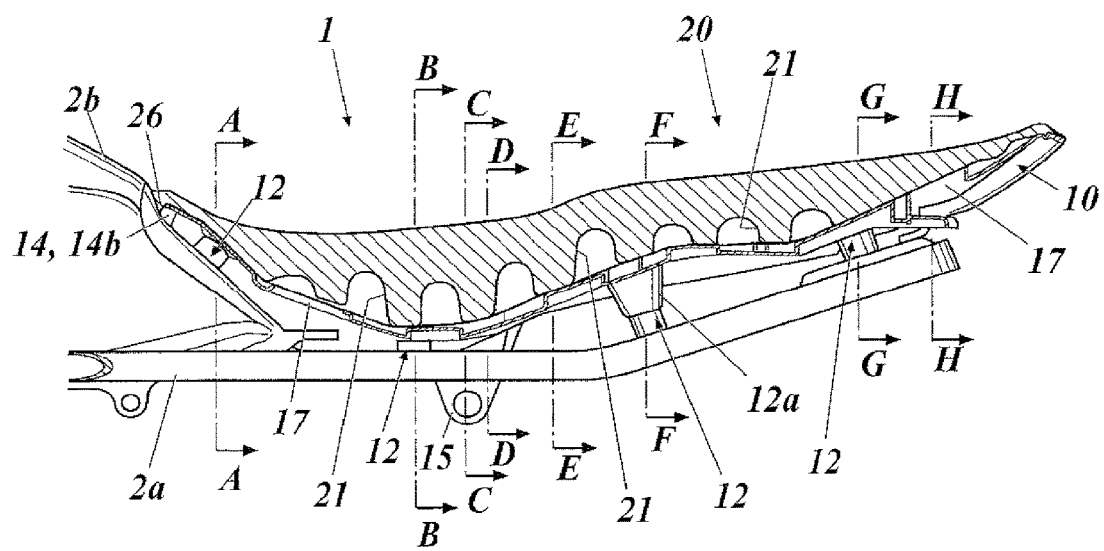
FIG. 7 is a side cross-sectional view of the vehicle seat shown in FIG. 1.

As shown in FIGS. 4, 5, 7, etc., the bottom plate 10 is provided with a plurality of mounting sections 12 through which the bottom plate 10 is fixed to the vehicle body 2, the mounting sections 12 being formed on the back side of the bottom plate 10 with spaces therebetween.

The mounting sections 12 refer to the parts which are to be fixed to the vehicle body 2 themselves and also to elastic members such as rubbers attached to the above parts and the parts where the elastic members are to be attached.

As shown in FIGS. 8, 9, 13 and 14, these elastic members have projected insertion sections and are fixed to the bottom plate 10 by the insertion sections being inserted to and engaged with the insertion holes formed in the bottom plate 10. Here, the elastic member may be fixed to the underside of the bottom plate 10 by welding or the like, for example.

In each of the elastic members of the mounting sections 12, a bolt hole is formed near the center thereof. The bottom plate 10 can be fixed to the seat rail 2a of the vehicle body 2 by the bolts which are inserted through the bolt holes.

With respect to a part where the distance to the seat rail 2a is long, a leg section 12a is formed on the back side of the bottom plate 10 in an integrated fashion and an elastic member of a mounting section 12 is fixed at the tip of the leg section 12a. That is, such mounting section 12 includes the leg section 12a.

The leg section 12a is formed so as to be recessed at the upper side of the bottom plate 10. That is, the leg section 12a includes a concave section 12b which is recessed at the upper side of the bottom plate 10.

The plurality of mounting sections 12 of the embodiment are symmetrically arranged at eight points on the back side of the bottom plate 10. Pairs of mounting sections 12 and 12 are arranged in four rows along the front-to-back direction of the bottom plate 10, the mounting sections 12 and 12 forming each pair are arranged widthwise.

The mounting sections 12, 12 which are provided at the front end part of the bottom plate 10 (in the first row from the front) among the plurality of mounting sections 12 abut the fuel tank 2b of the vehicle body 2 as shown in FIG. 7. These mounting sections 12, 12 in the first row are not fixed to the fuel tank 2b by bolts and are not fixed to the seat rail 2a.

The reinforcement sections 11 are arranged between the plurality of mounting sections 12, 12 which are apart from each other. In the embodiment, the bottom plate 10 is provided with a plurality of reinforcement sections 11 as shown in FIGS. 4 and 5. The bottom plate 10 further includes intersections 13 where the plurality of reinforcement sections 11 intersect with each other. That is, the plurality of reinforcement sections 11 are made to intersect with each other and are arranged in different directions. Comparing to a case where the plurality of reinforcement sections 11 are not made to intersect with each other, in the above arrangement, rigidity of the bottom plate can be improved more.

The plurality of reinforcement sections 11 of the embodiment are symmetrically arranged when being arranged in different directions.

Further, in the embodiment, the bottom plate 10 is provided, with a plurality of intersections 13.

On the surface of one of the plurality of intersections 13, 13, a reinforcement rib 13a for improving rigidity at the intersection 13 is formed in an integrated fashion.

The plurality of intersections 13 and 13 are arranged along the width-wise center C1 of the bottom plate 10 leading to improving rigidity at the width-wise center C1 in the bottom plate 10 where the load is likely to be applied.

Further, the plurality of intersections 13 and 13 are arranged avoiding the lowest position 1a in the bottom plate 10. The lowest position 1a in the bottom plate 10 is the maximum, load section where a great portion of the load of a passenger is applied. The intersections 13 are the parts in the bottom plate 10 where rigidity is improved. Therefore, the position where the passenger load is applied greatly and the parts where rigidity is improved by the intersections 13 do not overlap. Thereby, the passenger can be prevented from feeling a strong uncomfortable pressure and a comfortable sitting condition can be provided to the passenger.

In the embodiment, as shown in FIG. 5, the front side intersection 13 of the plurality of intersections 13 and 13 is disposed between the mounting sections 12 and 12 of the second row and the mounting sections 12 and 12 of the third row, the rows being counted from the front. On the other hand, the lowest position 1a, which is the maximum load section, is between the mounting sections 12 and 12 of the first row and the mounting sections 12 and 12 of the second row, the rows being counted from the front. Thus, the intersection 13 is arranged avoiding the lowest position 1a which is the maximum load section.

The bottom plate 10 includes a pair of projection sections 15 and 15 which project toward the vehicle body 2 and are to be fixed to the vehicle body 2. The projection sections 15 and 15, which forms a pair, are respectively arranged near the mounting sections 12, 12 of the second row.

The pair of projection sections 15, 15 are formed so as to be recessed at the upper side of the bottom plate 10. That is, each of the projection sections 15, 15 which form a pair is provided with a concave section 15a which is recessed at the upper side of the bottom plate 10.

The bottom plate 10 further includes an engaging section 18 which engages with the vehicle body 2. As for the engaging section 18, as shown in FIGS. 4, 5 and 7, a claw section 18a provided at the position of the through hole 17 at the rear end part of the bottom plate 10 is suggested, for example. Although it is not shown in the drawings, the vehicle body 2 may be provided with a to-be-engaged section where engages with the claw section 18a.

The bottom plate 10 includes a way to improve rigidity of the bottom plate 10 other than the reinforcement sections 11.

As one way, the bottom plate 10 includes a rim reinforcement section 14 along the rim of the bottom plate 10 as shown in FIGS. 3, 6 to 8. The rim of the bottom plate refers to the entire periphery edge of the bottom plate 10. That is, by such rim reinforcement section 14, rigidity of the entire periphery edge of the bottom plate 10 can be improved.

Further, as shown in FIGS. 2 to 8, in particular, the rim reinforcement section 14 includes a main reinforcement section 14a which is provided along the periphery edge of the part corresponding to the position where a passenger sits in the bottom plate 10 and a step section 14b which is provided along the entire periphery edge of the bottom plate 10 including the main reinforcement section 14a. The edge of the surface material 3 is fixed to the step section 14b.

In the bottom plate 10, the part corresponding to the position where a passenger sits is more in the rear than the part where a passenger who drives the automatic two wheeled vehicle sits (the lowest position 1a). That is, since the part anterior to the lowest position 1a is right above the fuel tank 2b, this position is not preferable as the position where a passenger sits.

Therefore, the main reinforcement section 14a is provided posterior to the lowest position 1a in the bottom plate 10 so as to surround the edge of the bottom plate 10. In other words, with the main reinforcement section 14a, rigidity at the rim of the part corresponding to the position where a passenger sits in the bottom plate 10 can be improved in particular.

On the other hand, the step section 14b is arranged at the edge that is outside than the main reinforcement section 14a. Thereby, rigidity of the entire rim of the bottom plate 10 including the main reinforcement section 14a can be improved by the step section 14b. Therefore, rigidity of the bottom plate 10 can also be improved. In other words, even if the automatic two wheeled vehicle is pulled up with a finger by the rim of the bottom plate 10 when pulling it up, the bottom plate 10 can be prevented from deforming due to the weight of the automatic two wheeled vehicle.

As shown in FIG. 5, the step section 14b includes a bent section 14c which forms a difference in level of the step section 14b and which is for positioning the fixation points of the edge 3a of the surface material 3. That is, the edge of the bottom plate 10 is formed to have a step section by the material being bent. In the step section 14b which is formed to have a difference in level, the bent section 14c is where an internal angle is formed on the back side of the bottom plate 10. The edge 3a of the surface material 3 is fixed to the bent section 14c by staples 4.

Figure 6:
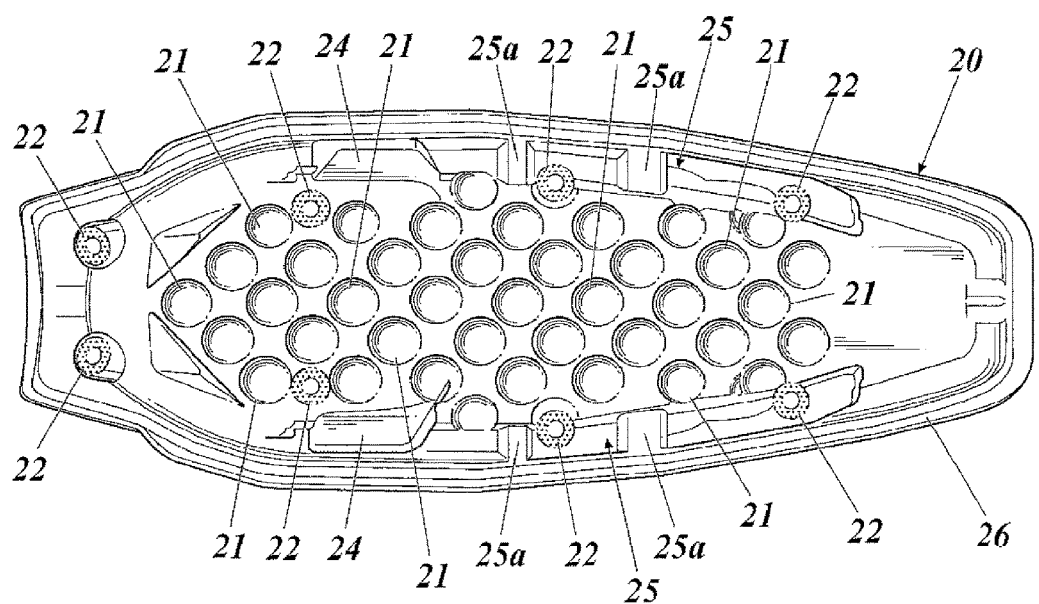
FIG. 6 is an underside of a cushion material according to the first embodiment.

As a way to improve rigidity of the bottom plate 10, the bottom plate 10 includes a reinforcement convex section 16 as shown in FIGS. 6 and 7.

The reinforcement convex section 16 is provided at the center part of the bottom plate 10 where surrounded by the plurality of reinforcement sections 11 which are connected to the mounting sections 12, 12 of the third row. That is, the reinforcement convex section 16 is formed adjacent to the reinforcement sections 11 as a convex section with respect to the reinforcement sections 11 which are formed to have a cross-sectional concave shape. Here, the reinforcement convex section 16 is formed so as to be recessed at the back side of the bottom plate 10.

On the surface of the diamond shape recessed section at the center of the reinforcement convex section 16, a reinforcement rib 16a for improving rigidity at the diamond shaped recessed section is formed in an integrated fashion.

Figure 8:
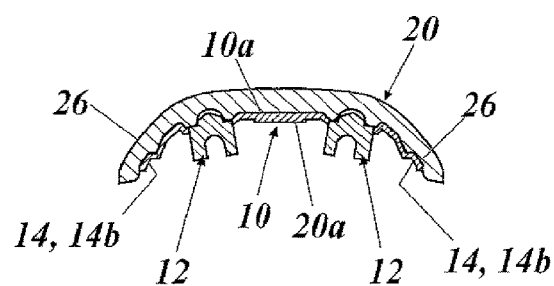
FIG. 8 is a cross-sectional view when cut along the line A-A shown in FIG. 7.
Figure 9:
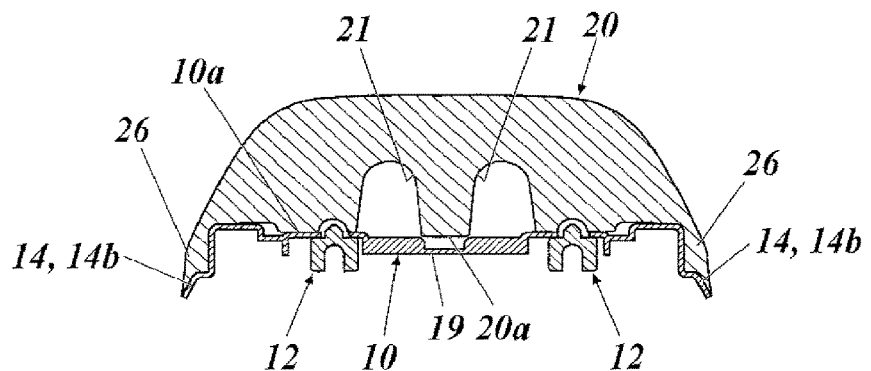
FIG. 9 is a cross-sectional view when cut along the line B-B shown in FIG. 7.

Further, as a way to improve rigidity of the bottom plate 10, the bottom plate 10 includes various types of concave and convex sections as shown in FIGS. 6 to 8.

As such various types of concave and convex sections, a belt-like bead 19 which is a convex section formed intermittently along the width-wise C2 of the bottom plate 10, a concave section 19a formed around the front side through hole 17 of the bottom plate 10, a concave section 19b which intersects the rear side intersection 13 of the bottom plate 10 from left to right, etc. are suggested, for example.

According to the embodiment, the bottom plate 10 includes the reinforcement sections 11 which intersects with the width-wise center C1 of the bottom plate 10, at least a part of each reinforcement section 11 being arranged obliquely with respect to the front-to-back direction of the vehicle seat 1 as an oblique line. However, this is not limitative in anyway. The reinforcement sections 11 may be arranged in the front-to-back direction and in the left-to-right direction of the bottom plate 10, for example.

Next, the cushion material 20 will be described in detail.

As shown in FIG. 2, the cushion material 20 includes space sections 21 (21a). Since a porous material such as urethane foam as described above is used for the cushion material 20, the cushion material 20 includes countless small pores which are generated due to foaming in the manufacturing process. The space sections 21 (21a) are different from the countless small pores. They are not in micro sizes and they are formed intentionally in the cushion material 20.

The space sections 21 are formed at the back side of the cushion material 20 and are opened toward the bottom plate 10. The space section 21a is a hollow section formed inside the cushion material 20. Either the concave sections 21 or the hollow section 21a is formed in the cushion material 20.

In the embodiment, the concave sections 21 are adapted as the space sections. Further, it is assumed that a plurality of concave sections 21 are formed in the cushion material 20. By the concave sections 21 being formed in the cushion material 20, the cushion material 20 can bend easily toward the bottom plate 10 when a passenger sits on the vehicle seat 1.

Each concave section 321 is formed in a dome shape that the size gradually becomes smaller as approaching the upper side from the reference surface 20a of the cushion material 20 and that the upper most part whereof is a curved surface. Since all of the plurality of concave sections 21 are formed in such way, the cushion material 20 can bend easily when a load is applied near the concave sections 21. Further, there is an advantage that the cushion material 20 can be taken out easily from a mold which is in a contrasting shape of the concave sections 21 when forming the cushion material 20.

The plurality of concave section 21 are arranged along the front-to-back direction of the cushion material 20 on the width-wise center C3 of the cushion material 20.

That is, the width-wise center C3 of the cushion material 20 is the part where the load of a passenger is likely to be applied. Such width-wise center C3 of the cushion material 20 where the load is likely to be applied can be made to bend easily in the front-to-back direction of the cushion material 20 by the plurality of concave sections 21 which are arranged in a line.

As described above, since the plurality of mounting sections 12 which are to be fixed to the vehicle body 2 are provided along the inner periphery on the back side of the bottom plate 10 with spaces therebetween, rigidity of the bottom plate 10 itself can be improved. A plurality of other concave sections 21 are formed in the cushion material 20 at between the section corresponding to the positions of the plurality of mounting sections 12 and the plurality of concave sections 21 arranged along the width-wise center C3 of the cushion material 20. That is, the plurality of concave sections 21 can be formed in the cushion material 20 within the range corresponding to where rigidity of the bottom plate is increased by the plurality of mounting sections 12. Therefore, while stably supporting the cushion material 20 by the bottom plate 10, bending of the cushion material 20 can be improved even more.

In FIG. 6, a plurality of mounting section corresponding parts 22 are shown as the parts corresponding to the plurality of mounting sections 12 in the cushion material 20.

As described above, the upper surface of the bottom plate 10 and the under surface of the cushion material 20 are the reference surfaces 10a and 20a, respectively. Since the plurality of concave sections 21 are formed on the under surface of the cushion material 20, the surface excluding the plurality of concave sections 21 is the reference surface 20a. Therefore, even if the plurality of concave sections 21 are formed at the back side of the cushion material 20, the bottom plate 10 can easily support the cushion material 20.

Figure 16:
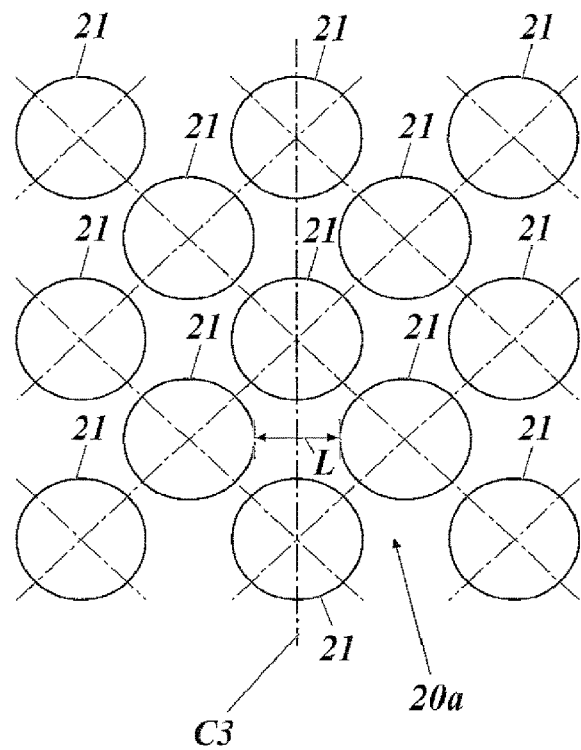
FIG. 16 is a diagram for explaining an arrangement of concave sections in the cushion material according to the first embodiment.

As shown in FIGS. 6 and 16, the plurality of concave sections 21 are arranged in a grid pattern. Further, the plurality of concave sections 21 arranged in a grid pattern are arranged in diagonal directions with respect to the front-to-back direction of the cushion material 20.

In such way, since the plurality of concave sections 21 are arranged in a grid pattern, the plurality of concave sections 21 can be lined neatly and efficiently within the back side range of the cushion material 20 and a great number of concave sections 21 can be formed. Moreover, even if the plurality of concave sections 21 which are arranged in a grid pattern are arranged in diagonal directions with respect to the front-to-back direction of the cushion material 20, the plurality of concave sections 21 can be lined neatly and efficiently within the back side range of the cushion material 20. Therefore, a great number of concave sections 21 can be formed.

Since the concave sections 21 are arranged in diagonal directions, with respect to two rows of the plurality of concave sections 21 wherein the concave sections are adjacent to each other, the positions of the plurality of concave sections 21 in one row and the positions of the plurality of concave sections 21 in the other row can be shifted in the left and right. In other words, the plurality of concave sections 21 can be arranged in a zigzag pattern. Thereby, for example, the bending degree of the cushion material 20 can be improved by making the size of the plurality of concave sections 21 be larger. Further, even more concave sections 21 can be arranged densely by making the plurality of concave sections 21 be closer to each other.

Figure 17:
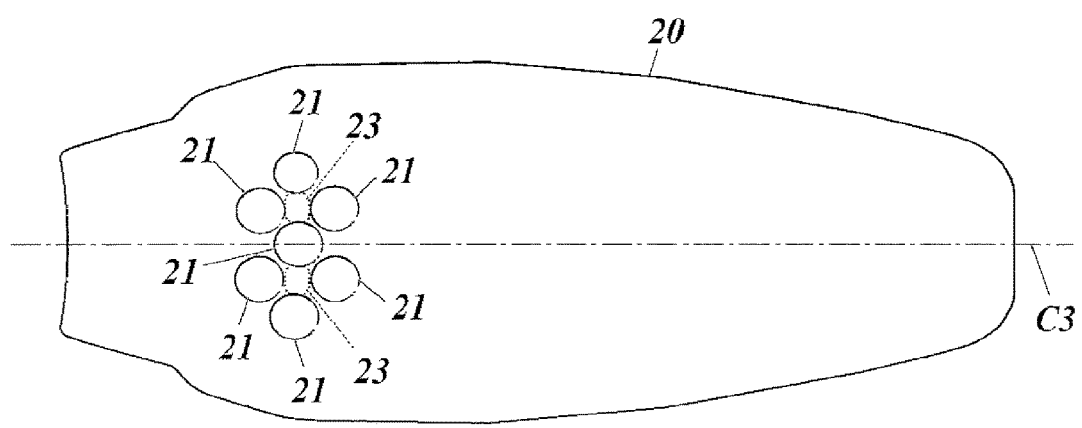
FIG. 17 is a diagram for explaining an arrangement of concave sections and the expected ischium position according to the first embodiment.

As shown in FIG. 17, the cushion material 20 includes a pair of expected ischium sections 23, 23 as regions in the cushion material 20 where expected to be the positions corresponding to the ischium position of a passenger. In other words, in the cushion material 20, the pair of expected ischium sections 23, 23 are parts where the load of a passenger is likely to be applied (the arrows Y1 in FIG. 18).

In the embodiment, the plurality of concave sections 21 are arranged at positions avoiding the pair of expected ischium sections 23, 23. Thereby, the reference surface 20a is to be arranged at the positions of the pair of expected ischium sections 23, 23. Thus, the ischium of a passenger can be supported stably.

Further, one of the plurality of concave sections 21 is arranged between the expected ischium sections 23, 23 which form the pair. That is, as described above, the cushion material 20 can be made lighter while stably supporting the positions of the pair of expected ischium sections 23, 23 by the reference surface 20a. Moreover, the parts where the load of a passenger is likely to be applied in the cushion material 20 can be prevented from having trouble bending.

Figure 18:
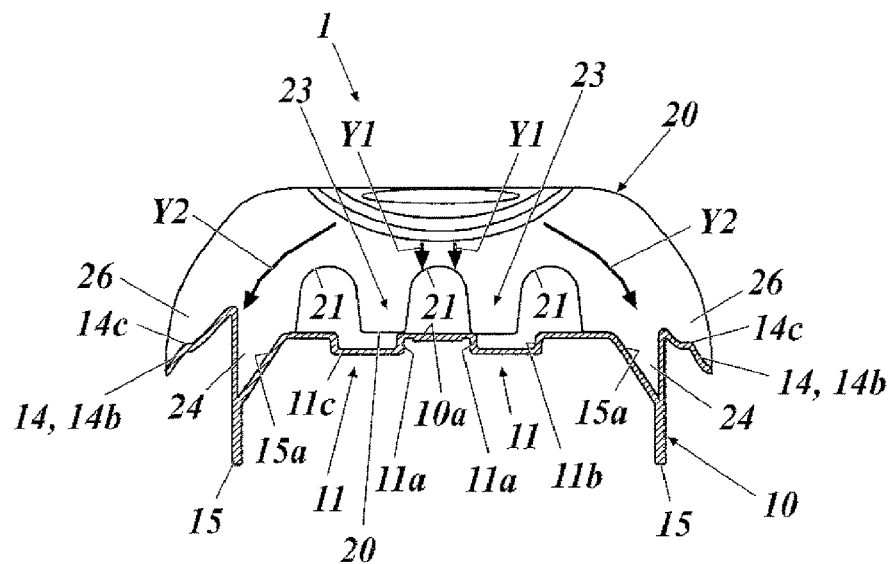
FIG. 18 is a diagram explaining a state where the cushion material is bent according to the first embodiment.

In the embodiment, the reference surface 20a side periphery of the concave section 21 arranged between the expected ischium sections 23, 23 which form the pair is supported by the bottom plate 10 as shown in FIG. 18. In particular, the reference surface 20a side periphery of such concave section 21 is supported by the turning sections 11a, 11a of the reinforcement sections 11, 11 which are positioned under the expected ischium sections 23, 23 which form the pair.

That is, since the edge of the concave section 21 between the expected ischium sections 23, 23 which form the pair, these sections being where the load of a passenger is likely to be applied, is supported by the turning sections 11a, 11a in the bottom plate 10 where rigidity is high, vicinity of the pair of expected ischium sections 23, 23 can be supported even more stably while maintaining likeliness of bending at vicinity of the pair of expected ischium sections 23, 23 by the concave section 21.

As shown in FIG. 18, the concave sections 21, 21 are respectively arranged on the right and the left of the concave section 21 arranged between the expected ischium sections 23, 23 which form the pair. In the embodiment, with respect to these left and right concave sections 21, 21, only the outside parts of the reference surface 20a side peripheries of the left and right concave sections 21, 21 are supported by the bottom plate 10.

In a case of a two wheeled vehicle, body weight shifts toward the curving direction when entering a curve (see arrows Y2 in FIG. 18). At this time, by the outside parts of the reference surface 20a side peripheries of the left and right concave sections 21, 21, the positions in the cushion material 20 where the load is likely to be applied when entering a curve are supported. Therefore, sitting can be stable when entering a curve.

In FIG. 18, the oval shape at the upper center of the cushion material 20 and the three half circle shapes below the oval shape are images expressing the passenger load applied to the cushion material 20. The arrows Y1 and Y2 indicate the directions of the passenger load.

As shown in FIG. 18, the cushion material 20 is further provided with insertion sections 24, 24 which are to be inserted in to the concave sections 15a, 15a of the projection sections 15, 15 of the bottom plate 10 at further outside of the left and right concave sections 21, 21. These insertion sections 24, 24 are formed so as to protrude more downward than the reference surface 10a of the bottom plate 10.

Since the insertion sections 24, 24 are provided further outside of the left and right concave sections 21, 21, the load can be supported by the insertion sections 24, 24 when the automatic two wheeled vehicle enters a curve.

At predetermined parts of the cushion material 20, the reference surface 20a of the cushion material 20 is arranged to vertically face the reinforcement sections 11 of the bottom plate 10.

Thereby, when the cushion material 20 bends, the cushion material 20 can sink more downward than the reference surface 20a by using the difference in level of the reinforcement sections 11, i.e. the turning sections 11a and the wall sections 11b. Therefore, the cushion material 20 can bend more easily.

That is, not only the reference surface 10a of the bottom plate 10 and the reference surface 20a of the cushion material 20 are tightly in contact with each other, but also the reference surface 20a partially sinks in to the recesses of the reinforcement sections 11 which are in a cross-sectional concave shape. Thus, the cushion material 20 can be prevented from having trouble bending.

Further, at predetermined parts of the cushion material 20, the length of the parts in the reference surface 20a of the cushion material 20 corresponding to the straight lines L that connect center points of the concave sections 21, 21 which are adjacent to each other in the left-to-right direction of the vehicle seat 1 is approximately equal to the width of the reinforcement sections 11.

Thereby, the parts in the reference surface 20a corresponding to the straight lines L which connect the center points of the concave sections 21, 21 which are adjacent to each other in the left-to-right direction of the vehicle seat 1 can be prevented from sinking in to the recesses of the reinforcement sections 11 and the cushion material 20 can be prevented from partially caving in.

That is, even if the reinforcement sections 11 are in a cross-sectional concave shape that are recessed at the upper side of the bottom plate 10, if the width of the reinforcement sections 11 and the length of the parts corresponding to the straight lines L in the reference surface 20a are approximately equal, the parts corresponding to the straight lines L do not sink in the recesses of the reinforcement sections 11. Therefore, at the above parts in the cushion material 20, the cushion material 20 can be prevented from partially caving in.

Even if the bottom plate 10 is provided with a plurality of reinforcement sections 11 and even if the cushion material 20 is provided with a plurality of concave sections 21, generally, the bottom plate 10 and the cushion material 20 are in a state where the reference surfaces 10a and 20a are in contact with each other. Therefore, it is expected that the bending degree of the cushion material is uniform overall.

As shown in FIGS. 6 and 11 to 14, the cushion material 20 includes edge concave sections 25, 25 provided at parts above the main reinforcement section 14a of the bottom plate 10, the edge concave sections 25, 25 being respectively arranged near the two side edges of the cushion material 20. Spaces are formed between the edge concave sections 25, 25 and the main reinforcement section 14a.

Each of the edge concave sections 25, 25 includes ribs 25a which are formed at a plurality of points along the front-to-back direction of the vehicle seat 1.

With such edge concave sections 25, 25, the cushion material 20 can be made lighter. When the vehicle seat 1 is to be used as a two-seater, since the parts corresponding to the edge concave sections 25, 25 are likely to bend, sitting properties thereof, including a case where the vehicle seat 1 is used as a two-seater, can be improved.

With respect to the plurality of ribs 25a, the under surfaces thereof are in contact with the upper surface of the main reinforcement section 14a. Therefore, the load of a passenger who sits behind the passenger who drives the automatic two wheeled vehicle can be supported easily.

Further, as shown in FIGS. 4 to 15, the cushion material 20 includes an abutting step section 26 which is provided around the entire periphery edge of the cushion material 20 and which abuts the upper side of the step section 314b of the bottom plate 10. That is, the abutting step section 26 is formed so as to correspond to the shape of the upper side of the step section 14b and is tightly in contact with the step section 14b.

By the step section 14b and the abutting step section 26 being in contact with each other, the entire periphery edge of the bottom plate 10 and the entire periphery edge of the cushion material 20 are in a unified state. Therefore, when folding the edge 3a of the surface material 3 in to the back side of the bottom plate 10 and fixating the edge 3a thereto, the surface material 3 can easily cover the edge of the bottom plate 10 and the edge of the cushion material 20.

Since a porous material such as urethane foam is used for the cushion material 20 as described above, the air goes through, enters and exits, the micro pores of the cushion material 20 when the cushion material bends and recovers from the bent state. Further, as described above, the reference surface 10a of the bottom plate 10 where the plurality of reinforcement sections 11 are formed and the reference surface 20a of the cushion material 20 wherein the plurality of concave sections 21 are formed are in contact with each other.

Therefore, one concave section 21 of the plurality of concave sections 21 and smother concave section 21 which is different from the one concave section 21 are in communication with each other through the reinforcement section 11 formed so as to be recessed at the upper side of the bottom plate 10. Thereby, when the cushion material 20 bends, the air can be let out to another concave section 21 from the one concave section 21 through the reinforcement sections 11. Therefore, the cushion material 20 can bend more easily.

Since the cushion material 20 is supported by the upper surface of the bottom plate 10 and is covered with the surface material 3, there may be a case where the air flow is blocked. In order to control this, the opening 17 is formed in the bottom plate 10 as an air passage.

According to the embodiment, since the cushion material 20 is provided with the concave sections 21, the cushion material 20 can be made lighter even without making the cushion material 20 be thinner as in a conventional case. Thereby, while maintaining a stable sitting, the vehicle seat 1 can be made lighter. Further, since a plurality of concave sections 21 are formed in the cushion material 20, the cushion material 20 can bend more easily.

Second Embodiment

Figure 19:
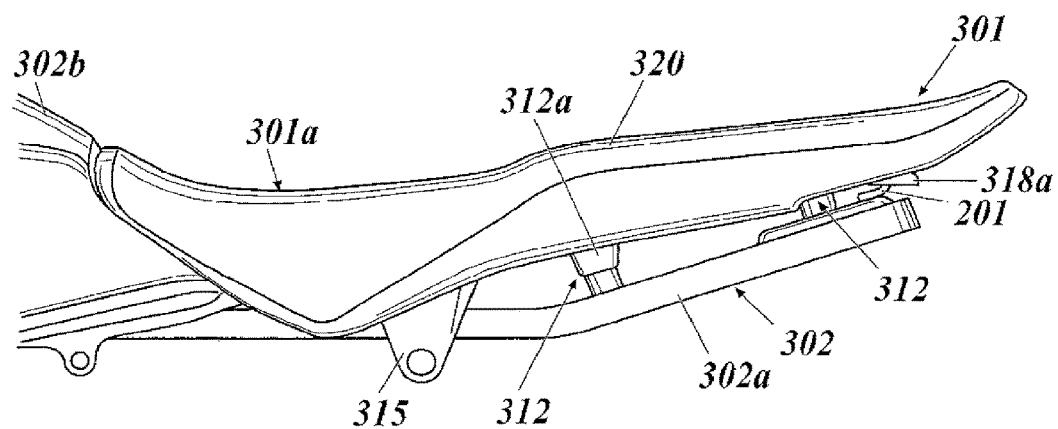
FIG. 19 is a side view of a vehicle seat according to the second embodiment.

In FIG. 19, the reference numeral 301 indicates a vehicle seat provided with a bottom plate structure according to the present invention. The vehicle seat 301 of the embodiment is to be used in an automatic two wheeled vehicle.

Here, the vehicle seat is not limited to the seats used in automatic two wheeled vehicles as in the embodiment. The vehicle seat includes seats of two wheeled vehicles such as motorcycles, scooters, snow mobiles and personal watercrafts, three wheeled buggies, straddle type vehicles, seats of construction machines, four wheeled vehicles, etc.

The vehicle seat 301 includes a bottom plate 310 which is provided on the vehicle body 302 of the automatic two wheeled vehicle, a cushion material 320 which is supported by the upper surface of the bottom plate 310 and a surface material 303 which covers the bottom plate 310 and the cushion material 320. That is, the vehicle seat 301 is formed by the cushion material 320 being supported on the bottom plate 310 and the cushion material 320 and the bottom plate 310 being covered with the surface material 303.

The parts of the vehicle body 302 where the bottom plate 310 is to be fixed are, in particular, the seat rail 302a which is laid on the vehicle body 302 and the fuel tank 302b in front of the vehicle seat 301.

The bottom plate 310 is formed by a resin material such as polypropylene, polyvinylchloride, etc., and is formed in a shape corresponding to the shape of the vehicle body 302 of the automatic two wheeled vehicle. The bottom plate 310 is attached to the vehicle body 302.

The bottom plate 310 of the embodiment is formed by using polypropylene as a material, for example. In order to fixate the bottom plate 310 to the vehicle body 302 of the automatic two wheeled vehicle, the polypropylene is to be especially hard. The bottom plate 310 may be provided with clasps or the like necessary to be fixed to the vehicle body 302 of the automatic two wheeled vehicle.

The cushion material 320 is formed of a soft foam material such as, for example, urethane foam, polypropylene foam or polyethylene foam. As for the cushion material 320 of the embodiment, for example, urethane foam is used.

Since the cushion material 320 is supported by the upper surface of the bottom plate 310, the under surface of the cushion material 320 is formed in a shape reflecting the shape of the upper surface of the bottom plate 310. Thereby, the cushion material 320 can be supported stably by the upper surface of the bottom plate 310. The surfaces of the bottom plate 310 and the cushion material 320 which contact each other, that is, the upper surface of the bottom plate 310 and the under surface of the cushion material 320 are referred to as the reference surfaces 310a and 320a, respectively.

The cushion material 320 is formed so that the part in the upper surface thereof where a passenger who drives the automatic two wheeled vehicle sits is lower than the other portion when seen from a side. This part is referred to as the lowest position 301a that is the lowest along the width-wise center C2 of the vehicle seat 301 in the front-to-back direction of the vehicle seat 301. The part near the lowest position 301a corresponds to the ischium position of the passenger who drives the automatic two wheeled vehicle and is the maximum load section where the maximum passenger load is applied in the vehicle seat 301.

The surface material 303 constitutes the sitting surface of the vehicle seat 301. The surface material 303 is where comes in contact with a passenger and is formed by a resin material such as polypropylene, polyvinylchloride or the like. As for the surface material 303 of the embodiment, for example, a hard material made of polypropylene is used.

Figure 21:
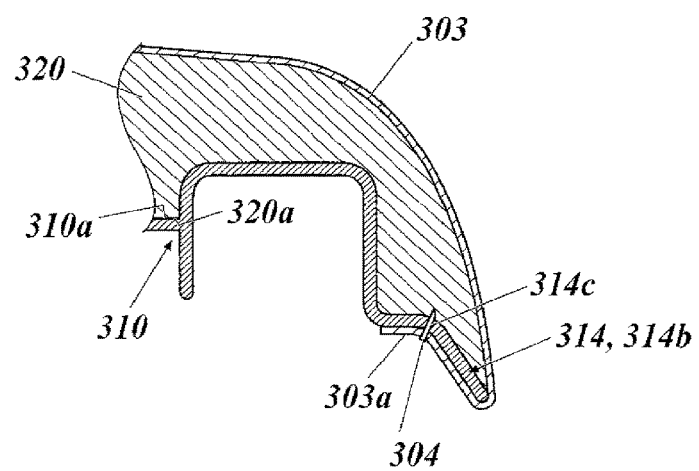
FIG. 21 is an enlarged cross-sectional view of a part of the vehicle seat according to the second embodiment.

As shown in FIG. 21, the edge 303a of the surface material 303 is folded in to the back side of the bottom plate 310 and is fixed to the back side of the bottom plate 310 by staples 304.

The edge 303a of the surface material 303 refers to the entire periphery edge of the surface material 303. Therefore, the edge 303a of the surface material 303 is fixed along the entire periphery edge of the bottom plate 310.

Next, the bottom plate 310 will be described in more detail.

The bottom plate 310 includes a plurality of reinforcement sections 311 which intersect with the width-wise center C1 of the bottom plate 310, each of which having at least a part thereof arranged obliquely with respect to the front-to-back direction of the vehicle seat as an oblique line. That is, the reinforcement sections 311 are not merely arranged vertically and horizontally (from front to back and from side to side) in the bottom plate 310. By the reinforcement sections 311 including parts that are arranged obliquely, it is expected to obtain rigidity in the front-to-back direction and the left-to-right direction.

Figure 20:
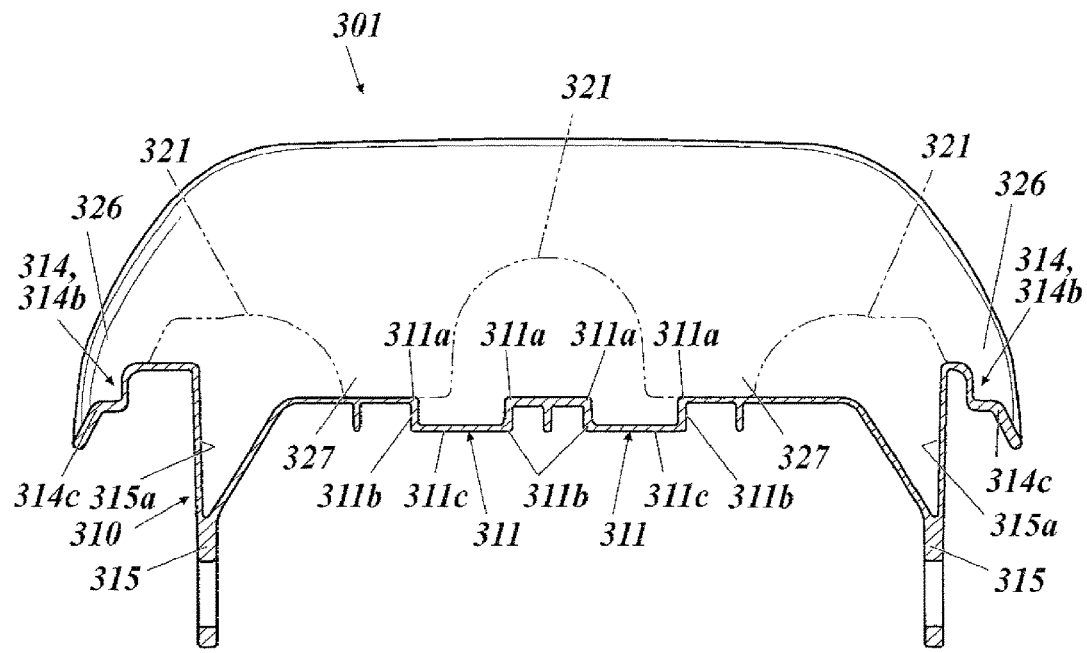
FIG. 20 is a cross-sectional view of the vehicle seat according to the second embodiment.
Figure 28:
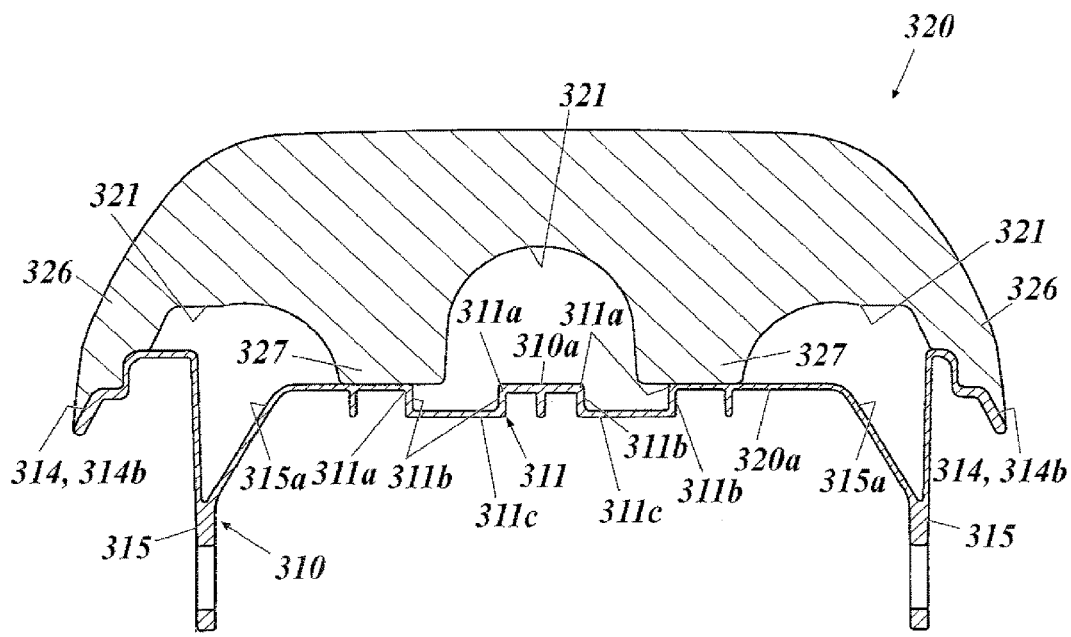
FIG. 28 is a cross-sectional view when cut along the line C-C shown in FIG. 25.
Figure 29:
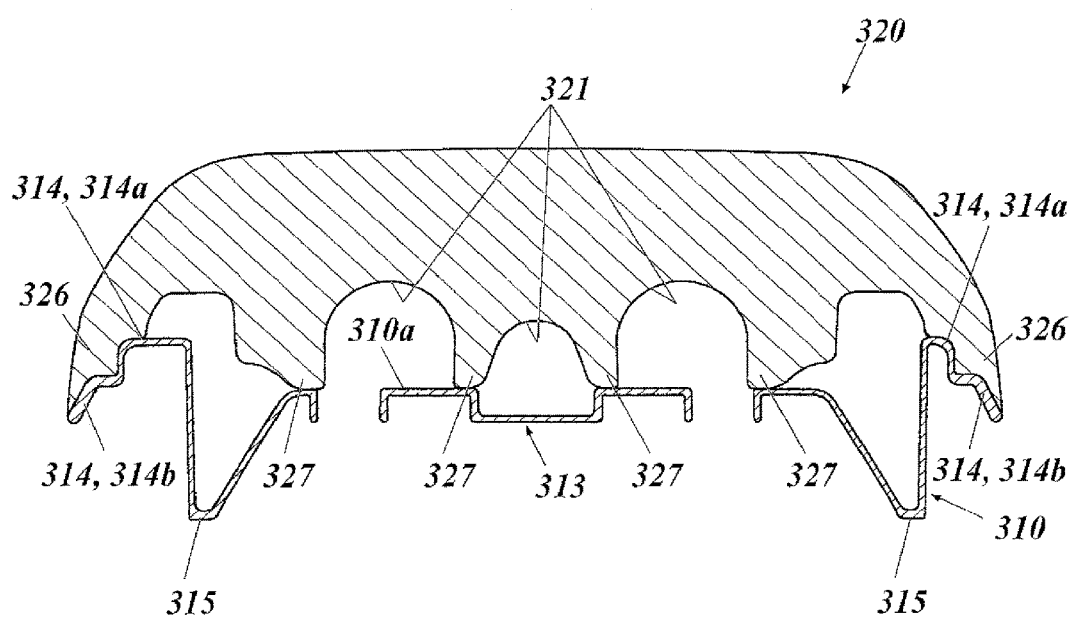
FIG. 29 is a cross-sectional view when cut along the line D-D shown in FIG. 25.
Figure 30:
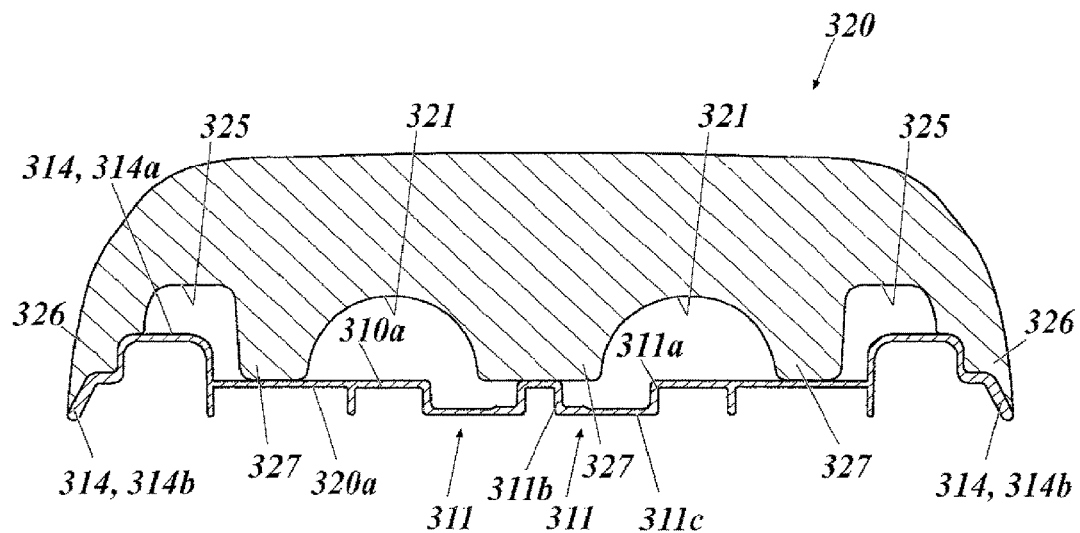
FIG. 30 is a cross-sectional view when cut along the line E-E shown in FIG. 25.

The reinforcement sections 311 are in a bead shape bulged at the back side of the bottom plate 310 and recessed at the upper side of the bottom plate 310. That is, as shown in FIGS. 20, 28, etc., each of the reinforcement sections 311 is formed in a cross-sectional concave shape and includes a pair of side walls 311b, 311b each of which formed by being bent downward from the upper surface of the bottom plate 310 and a bottom which is formed in an integrated fashion being bridged between the lower edges of the side walls 311b, 311b which form a pair. Corners where turned downward from the upper surface of the bottom plate 310 are referred to as turning sections 311a and are the parts having high rigidity in the reinforcement sections 311.

The upper side of the bottom plate 310 includes the upper surface of the bottom plate 310 and the surface of the step section 314b (described later) which is formed along the entire periphery edge of the bottom plate 310 and which is bent toward the vehicle body 302 than the upper surface of the bottom plate 310. On the other hand, the back side of the bottom plate 310 is the back of the upper side of the bottom plate 310 and includes the under surface of the bottom plate 310 and the back side of the step section 314b.

According to the above described reinforcement sections 311, a concave-convex figure is formed in the bottom plate 310 leading to improvement in rigidity of the bottom plate 310. Further, since the bottom plate 310 can be reinforced in a state where the upper side thereof is partially recessed, bending of the cushion material 320 which is supported by the upper surface of the bottom late 310 is not inhibited comparing to a case where the bottom plate 310 is reinforced in a state where the upper side thereof is partially bulged. Therefore, a comfortable sitting condition can be provided to a passenger.

Although the reinforcement sections 311 are formed in a cross-sectional concave shape in the embodiment, this is not limitative in any way. The reinforcement sections 311 may be formed in a protruding shape such as a rib on the back side of the bottom plate 310.

Figure 22:
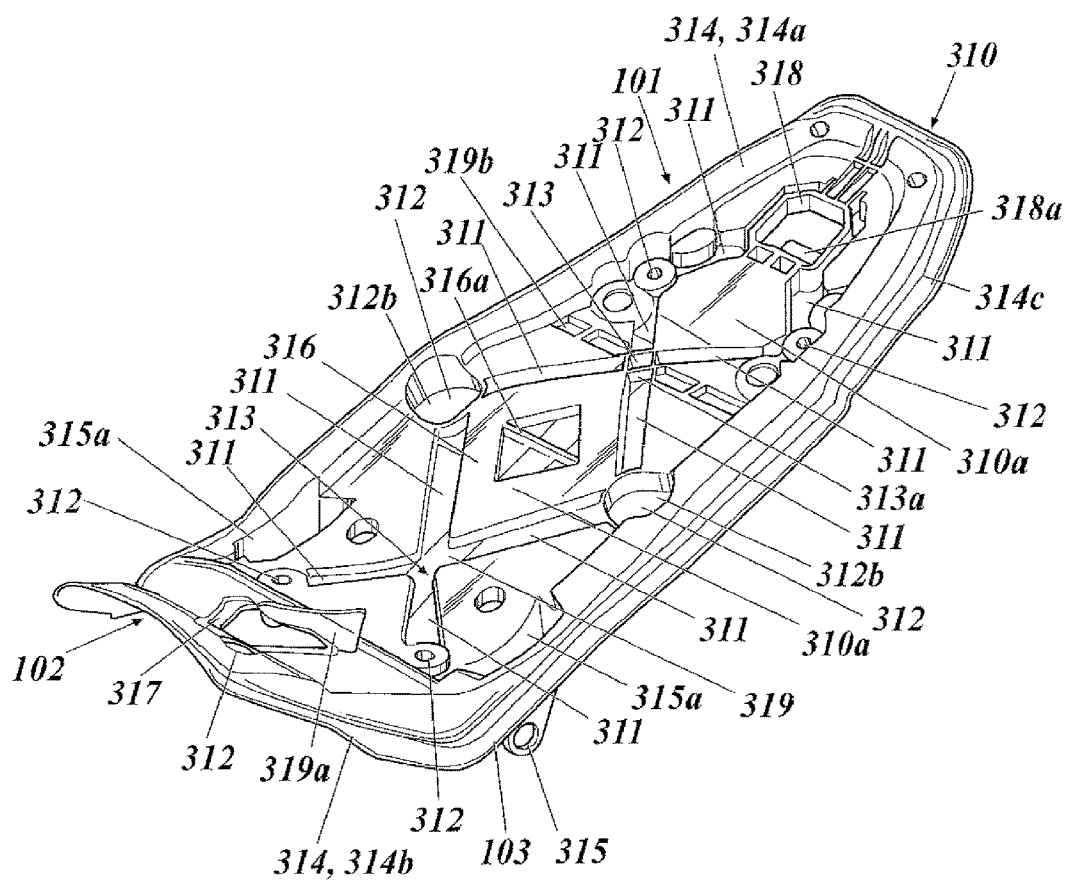
FIG. 22 is a schematic view of a bottom plate according to the second embodiment.
Figure 23:
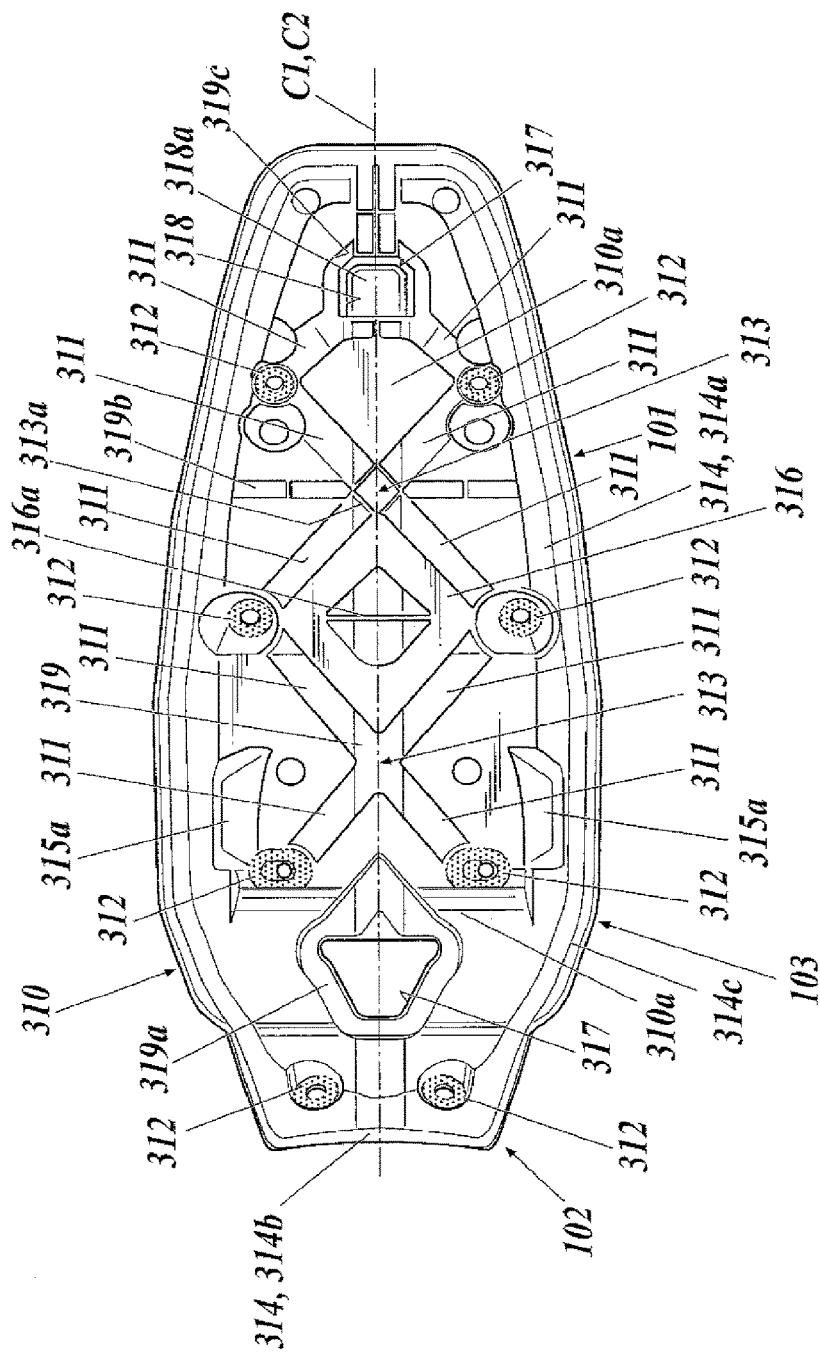
FIG. 23 is a plan view of the bottom plate according to the second embodiment.
Figure 25:
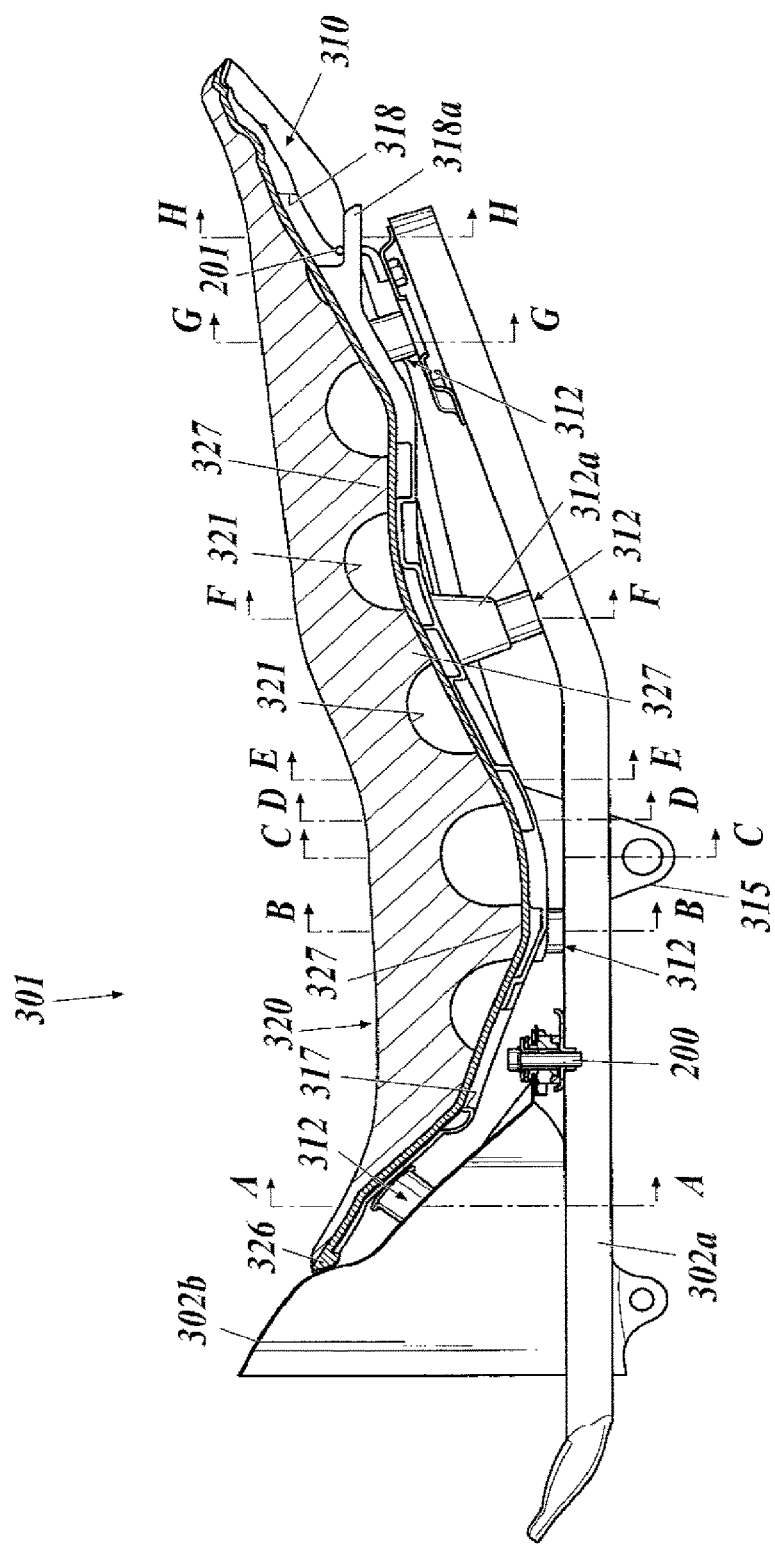
FIG. 25 is a side cross-sectional view of the vehicle seat shown in FIG. 19.

As shown in FIGS. 22, 23, 25, etc., the bottom plate 310 is provided with a plurality of mounting sections 312 through which the bottom plate 310 is fixed to the vehicle body 302, the mounting sections 312 being formed on the back side of the bottom plate 310 with spaces therebetween.

The mounting sections 312 refer to the parts which are to be fixed to the vehicle body 302 themselves and also to elastic members such as rubbers attached to the above parts and the parts where the elastic members are to be attached.

Further, as shown in FIGS. 26, 27, 31 and 32, the elastic members are provided with projecting inserting sections, and they are fixed to the bottom plate 310 by inserting the inserting sections in the insertion holes formed in the bottom plate 310 to engage the inserting sections and the insertion holes. For example, the elastic members may be fixed to the bottom of the bottom plate 310 by welding or the like.

In each of the elastic members of the mounting sections 312, a bolt hole is formed near the center thereof. The bottom plate 310 can be fixed to the seat rail 302a of the vehicle body 302 by the bolts which are inserted through the bolt holes.

With respect to a part where the distance from the bottom plate 310 to the seat rail 302a is long, a leg section 312a is formed on the back side of the bottom plate 310 in an integrated fashion and an elastic member of the mounting section 312 is fixed at the tip of the leg section 312a. That is, such mounting section 312 includes the leg section 312a.

The leg section 312a is formed so as to be recessed at the upper side of the bottom plate 310. That is, the leg section 312a includes a concave section 312b which is recessed at the upper side of the bottom plate 310.

The plurality of mounting sections 312 of the embodiment are symmetrically arranged at eight points on the back side of the bottom plate 310. Pairs of mounting sections 312 and 312 are arranged in four rows along the front-to-back direction of the bottom plate 310, the mounting sections 312 and 312 forming each pair are arranged widthwise.

Here, among the plurality of mounting sections 312, the mounting sections 312, 312 which are provided at the front end part (in the first row counting from the front) of the bottom plate 310 abuts the fuel tank 302b of the vehicle body 302 as shown in FIG. 25. These mounting sections 312, 312 of the first row are not fixed to the fuel tank 302b by bolts and are not fixed to the seat rail 302a.

The reinforcement sections 311 are arranged between the plurality of mounting sections 312, 312 which are apart from each other. In the embodiment, the bottom plate 310 is provided with a plurality of reinforcement sections 311 as shown in FIGS. 22 and 23. The bottom plate 310 further includes intersections 313 formed by the plurality of reinforcement sections 311 intersecting with each other. That is, the plurality of reinforcement sections 311 are made to intersect with each other and are arranged in different directions. Comparing to a case where the plurality of reinforcement sections do not intersect with each other, in the above arrangement, rigidity of the bottom plate can be improved more.

The plurality of reinforcement sections 311 of the embodiment are symmetrically arranged when being arranged in different directions.

Further, in the embodiment, the bottom plate 310 is provided with a plurality of intersections 313.

On the upper side of one of the plurality of intersections 313 and 313, reinforcement ribs 313a for improving rigidity at the intersection 313 are formed in an integrated manner.

The plurality of intersections 313 and 313 are arranged along the width-wise center C1 of the bottom plate 310, and rigidity at the width-wise center C1 in the bottom plate 310 where load is likely to be applied can be improved.

Further, the plurality of intersections 313 and 313 are arranged avoiding the lowest position 301a in the bottom plate 310. The lowest position 1a in the bottom plate 310 is the maximum load section where a great portion of the load of a passenger is applied. The intersections 313 are the parts in the bottom plate 310 where rigidity is improved. Therefore, the position where the passenger load is applied greatly and the parts where rigidity is improved by the intersections 313 do not overlap. Thereby, the passenger can be prevented from feeling a strong uncomfortable pressure and a comfortable sitting condition can be provided to the passenger.

In the embodiment, as shown in FIG. 23, the front side intersection 313 of the plurality of intersections 313 and 313 is disposed between the mounting sections 312 and 312 of the second row and the mounting sections 312 and 312 of the third row, the rows being counted from the front. On the other hand, the lowest position 301a, which is the maximum load section, is between the mounting sections 312 and 312 of the first row and the mounting sections 312 and 312 of the second row, the row being counted from the front. Thus, the intersection 313 is arranged avoiding the lowest position 301a which is the maximum load section.

The bottom plate 310 includes a pair of projection sections 315 and 315 which project toward the vehicle body 302 and are fixed to the vehicle body 302. The projection sections 315 and 315, which form a pair, are arranged near the mounting sections 312, 312 of the second row.

The pair of projection sections 315, 315 are formed so as to be recessed at the upper side of the bottom plate 310. That is, each of the projection sections 315, 315 which form a pair is provided with a concave section 315a which is recessed at the upper side of the bottom plate 310.

The bottom plate 310 is bent from near the mounting sections 312, 312 of the second row. If the part posterior to the mounting sections 312, 312 of the second row is the main surface section 101 and the part anterior to the mounting sections 312, 312 of the second row is the sub surface section 102, the sub surface section 102 which is arranged in front of the main surface section 101 is tilted upward with respect to the main surface section 101. The bent section between the main surface section 101 and the sub surface section 102 is the bent section 103.

Figure 27:
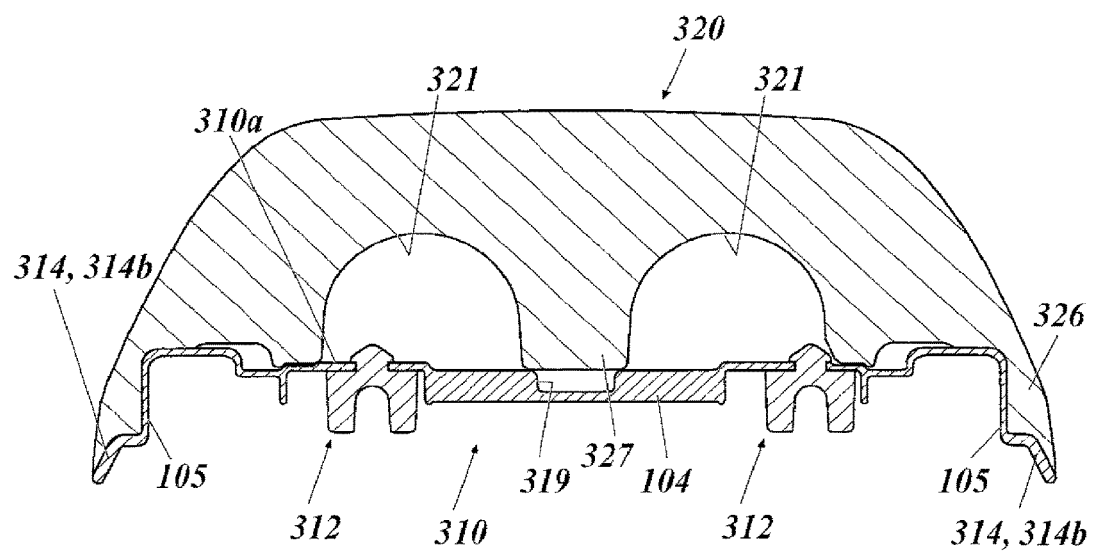
FIG. 27 is a cross-sectional view when cut along the line B-B shown in FIG. 25.

As shown in FIG. 27, a rib 104 which extends in the left-to-right direction is arranged between the mounting sections 312, 312 of the second row at the back side of the bent section 103 in the bottom plate 310.

At near the mounting sections 312, 312 of the second row, the reinforcement sections 311, 311 are arranged and the reinforcement sections 311, 311 form a convex V shape when seen from the above, the lower tip of the V shape pointing backward as shown in FIG. 23. Ends of the reinforcement sections 311, 311, which form a V shape, are arranged near the mounting sections 312, 312 of the second row. In such way, a top view V shaped bead (reinforcement sections 311, 311) arranged between the left and right mounting sections 312, 312 of the second row is formed.

As shown in FIGS. 23 and 27, at the bent section 103 of the bottom plate 310, wall sections 105, 105 which extend vertically are formed so as to face each other in the left-to-right direction, the wall sections being formed along the front-to-back direction. In particular, the wall sections 105, 105 are formed perpendicularly and the lower ends thereof continue to the step section 314b.

At the front and rear parts of the bottom plate 310, openings 317, 318 are respectively formed at the positions facing the vehicle body 302.

Figure 38:
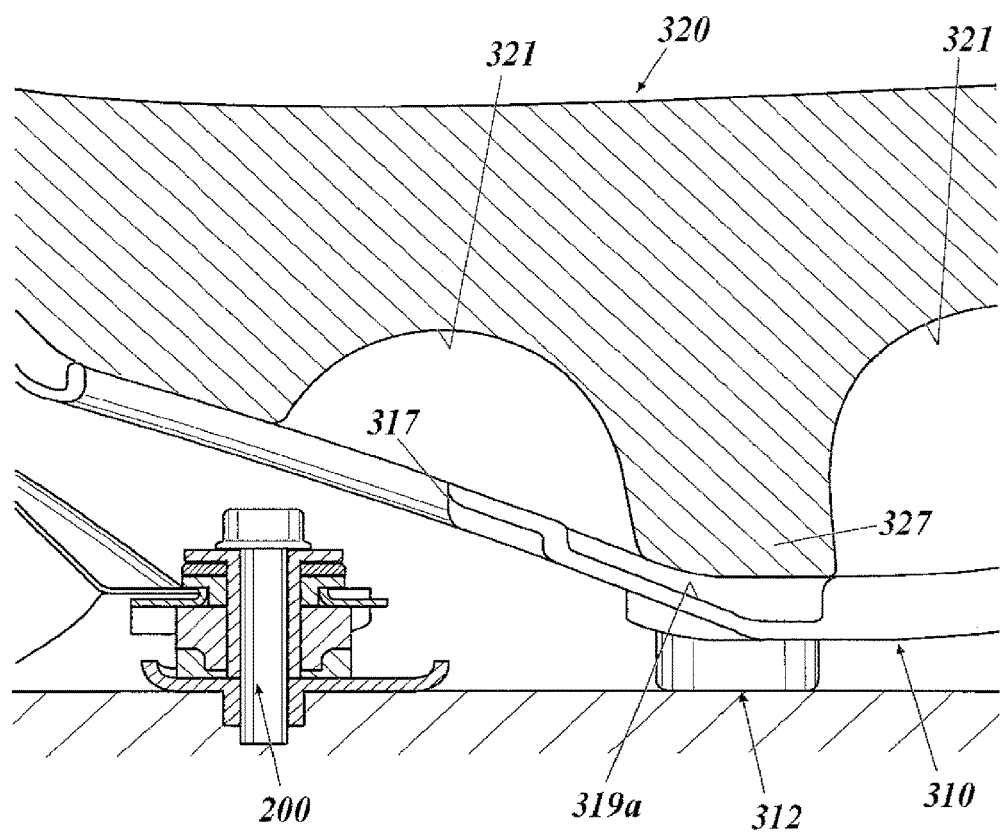
FIG. 38 is a cross-sectional view showing an overall structure near the front side opening of the bottom plate according to the second embodiment.
Figure 39:
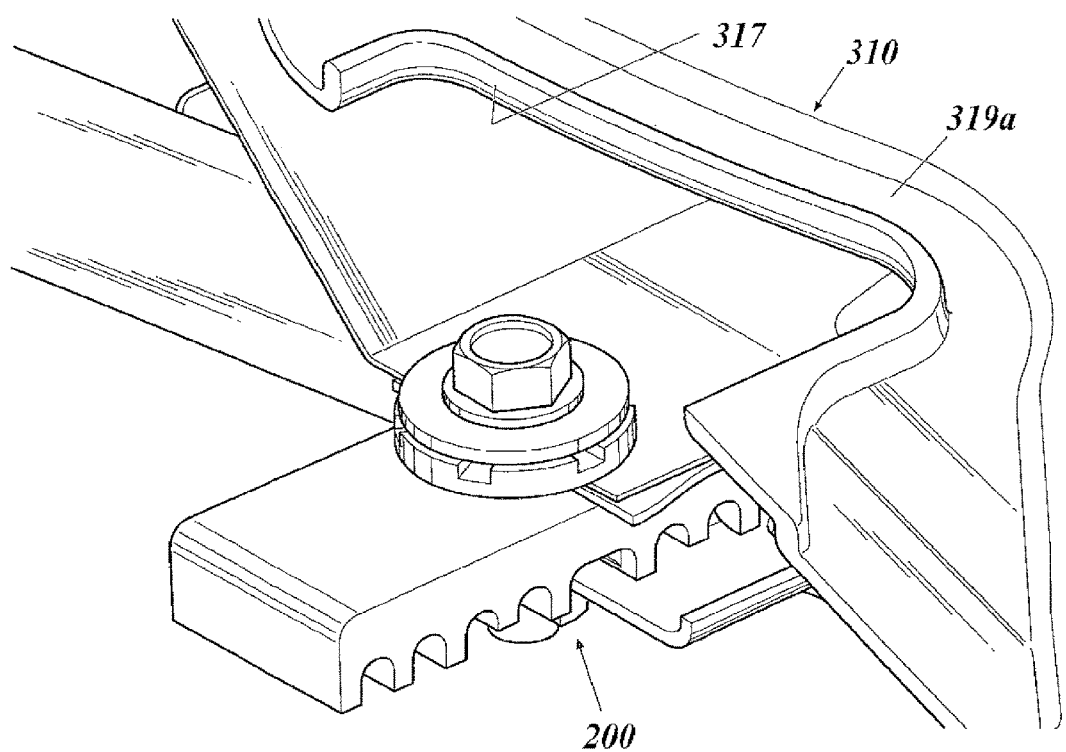
FIG. 39 is a schematic view where a part near the front side opening of the bottom plate according to the second embodiment is fractured.

As shown in FIGS. 38 and 39, the opening 317 at the front end part is for preventing the bottom plate 310 from interfering with an lock section 200 of the fuel tank 302b of the vehicle 2. For example, when a person sits on the vehicle seat 301, it is expected that the bottom plate 310 bends with the cushion material 320. The size of the opening 317 is set so that the bottom plate 310 can be prevented from interfering with the lock section 200 of the vehicle body 302 even if the bottom plate 310 bends.

Figure 40:
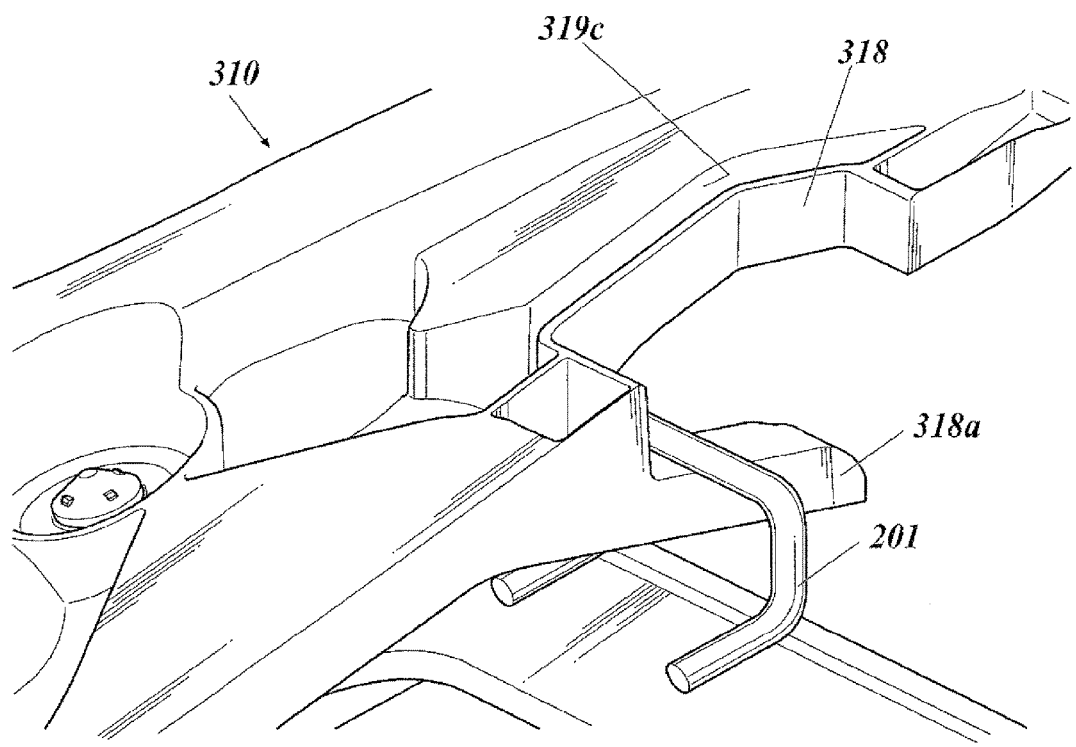
FIG. 40 is a schematic view where a part near the rear side opening of the bottom plate according to the second embodiment is fractured.
Figure 41:
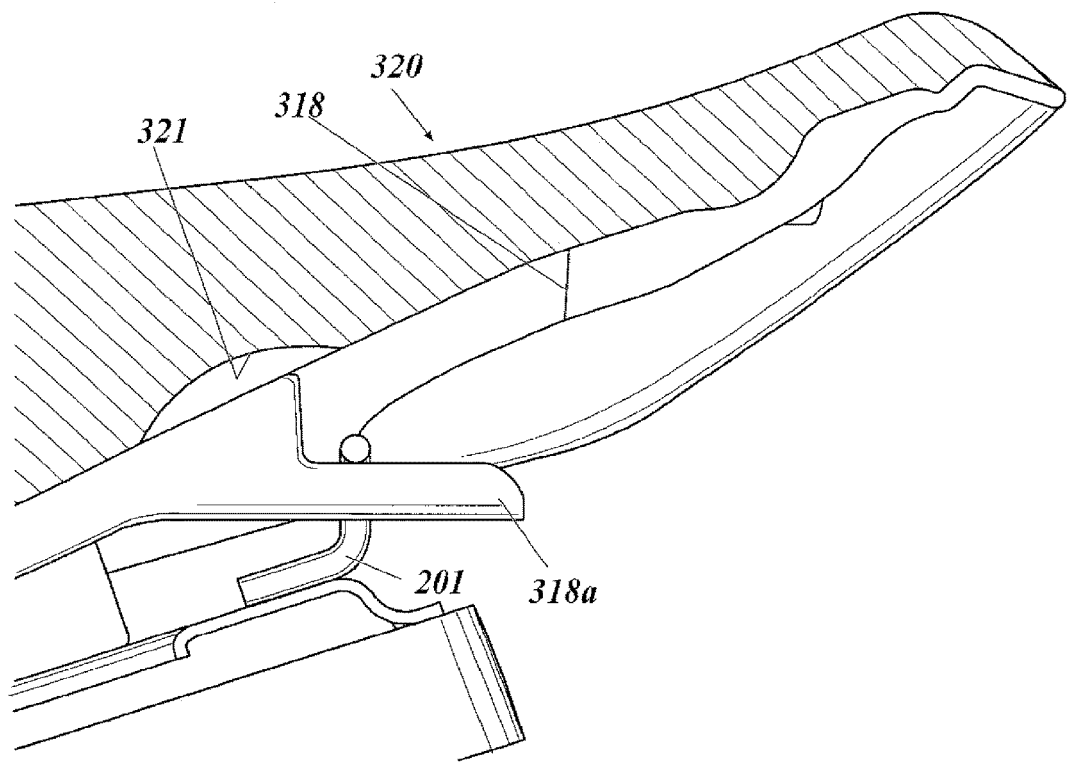
FIG. 41 is a cross-sectional view showing an overall structure near the rear side opening of the bottom plate according to the second embodiment.

As shown in FIGS. 40 and 41, at the opening 318 at the rear end part, an engaging section 318a which engages with the vehicle body 302 is formed. Here, the engaging section 318a is a projection plate which extends backward from the front part of the opening 318. This engaging section 318a is to engage with the to-be-engaged section 201 of the vehicle body 302.

The bottom plate 310 includes a way to improve rigidity of the bottom plate 310 other than the reinforcement sections 311.

As one way, the bottom plate 310 includes a rim reinforcement section 314 that is provided along the periphery edge of the bottom plate 310 as shown in FIGS. 21, 24 to 26. The rim of the bottom plate refers to the entire periphery edge of the bottom plate 310. That is, by such rim reinforcement section 314, rigidity of the entire periphery edge of the bottom plate 310 can be improved.

Further, as shown in FIGS. 20 to 26, the rim reinforcement section 314 includes a main reinforcement section 314a which is provided along the periphery edge of the part corresponding to the position where a passenger sits in the bottom plate 310 and a step section 314b which is provided along the entire periphery edge of the bottom plate 310 including the main reinforcement section 314a. The edge of the surface material 303 is fixed to the step section 314b.

In the bottom plate 310, the part corresponding to the position where a passenger sits is more in the rear than the part where a passenger who drives the automatic two wheeled vehicle sits (the lowest position 301a). That is, since the part anterior to the lowest position 1a is right above the fuel tank 302b, this position is not preferable as a position where a passenger sits.

Therefore, the main reinforcement section 314a is provided posterior to the lowest position 301a in the bottom plate 301 so as to surround the edge of the bottom plate 310. In other words, with the main reinforcement section 314a, rigidity at the rim of the part corresponding to the position where a passenger sits in the bottom plate 310 is improved in particular.

On the other hand, the step section 314b is arranged at the edge that is outside than the main reinforcement section 314a. Thereby, rigidity of the entire rim of the bottom plate 310 including the main reinforcement section 314a can be improved by the step section 314b. Therefore, rigidity of the bottom plate 310 can also be improved. In other words, even if the automatic two wheeled vehicle is pulled up with a finger by the rim of the bottom plate 310 when pulling it up, the bottom plate 310 can be prevented from deforming due to the weight of the automatic two wheeled vehicle.

As shown in FIG. 23, the step section 314b includes a bent section 314c which forms a difference in level of the step section 314b and which is for positioning the fixation points of the edge 303a of the surface material 303. That is, the edge of the bottom plate 310 is formed to have a step section by the material being bent. In the step section 314b which is formed to have a difference in level, the bent section 314c is where an internal angle is formed on the back side of the bottom plate 310. The edge 303a of the surface material 303 is fixed to the bent section 314c by staples 304.

Figure 31:
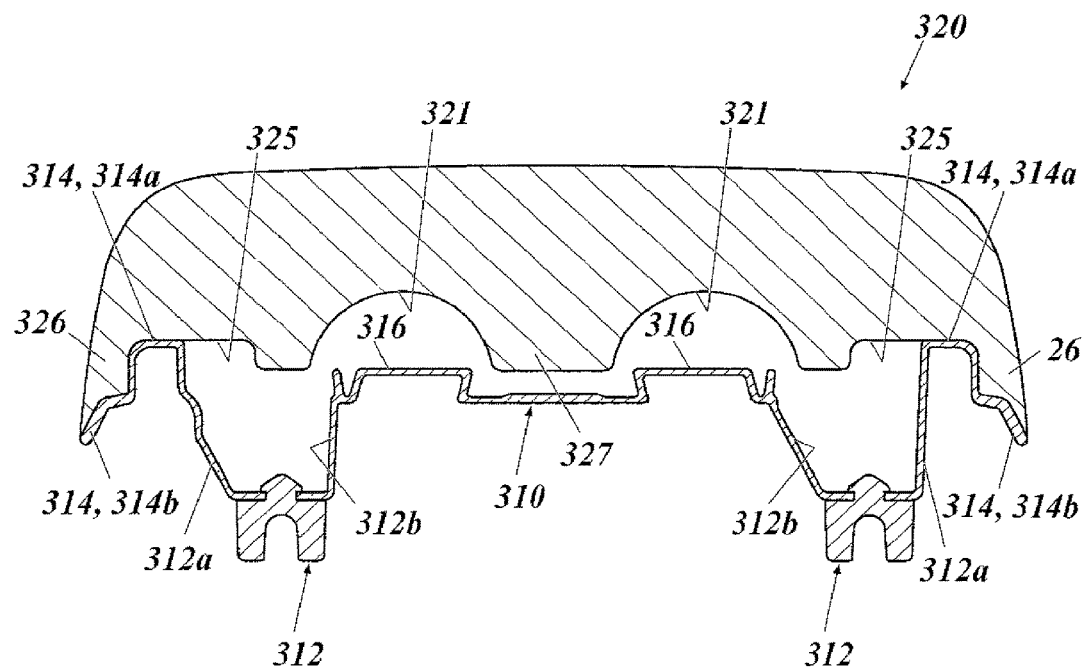
FIG. 31 is a cross-sectional view when cut along the line F-F shown in FIG. 25.
Figure 32:
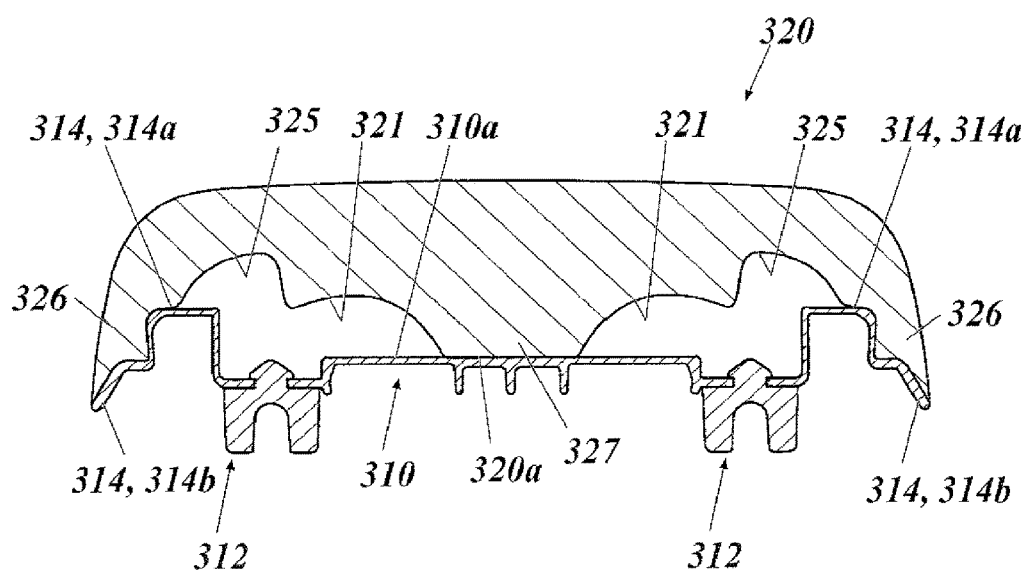
FIG. 32 is a cross-sectional view when cut along the line G-G shown in FIG. 25.
Figure 33:
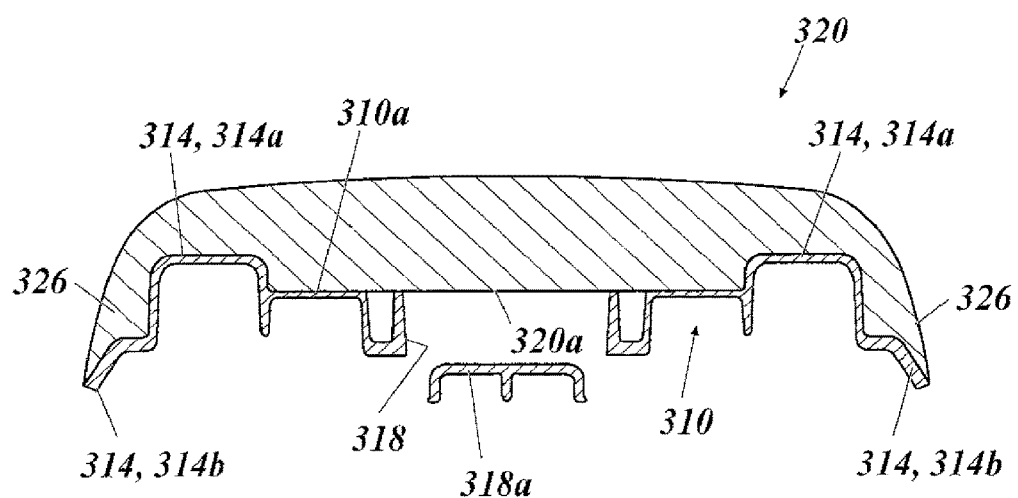
FIG. 33 is a cross-sectional view when cut along the line H-H shown in FIG. 25.

As a way to improve rigidity of the bottom plate 310, the bottom plate 310 includes a reinforcement convex section 316 as shown in FIGS. 22, 23 and 31.

The reinforcement convex section 316 is provided at the center part of the bottom plate 310 where surrounded by the plurality of reinforcement sections 311 which are connected to the mounting sections 312, 312 of the third row. That is, the reinforcement convex section 316 is formed adjacent to the plurality of reinforcement sections 311 as a convex section with respect to the reinforcement sections 311 which are formed to have a cross-sectional concave shape. Here, the reinforcement convex section 316 is formed so as to be recessed at the back side of the bottom plate 310.

On the surface of the diamond shape recessed section at the center of the reinforcement convex section 316, a reinforcement rib 316a for improving rigidity at the diamond shaped recessed section is formed in an integrated fashion.

Figure 24:
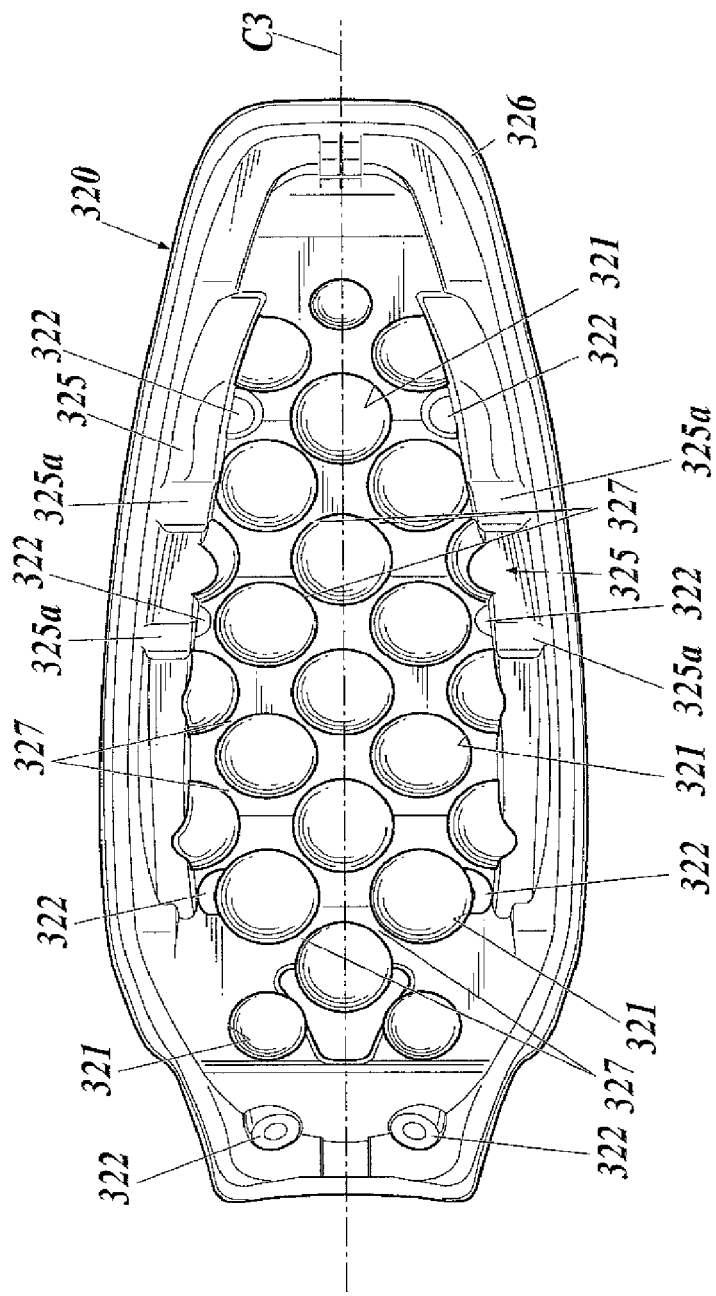
FIG. 24 is an underside of a cushion material according to the second embodiment.
Figure 26:
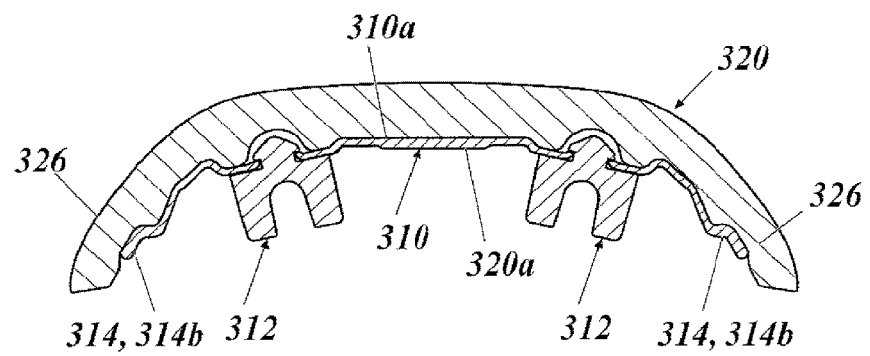
FIG. 26 is a cross-sectional view when cut along the line A-A shown in FIG. 25.

Further, as a way to improve rigidity of the bottom plate 310, the bottom plate 310 includes various types of concave and convex sections as shown in FIGS. 24 to 26.

As such various types of concave and convex sections, a belt-like bead 319 which is a convex section formed intermittently along the width-wise center C2 of the bottom plate 310, a concave section 19a formed around the front side opening 317 of the bottom plate 310, a concave section 319b which intersects the rear side intersection 313 of the bottom plate 310 from left to right, a concave section 319c which is formed around the rear side opening 318 of the bottom plate 310, etc. are suggested, for example. With the concave sections 319a and 319c, the parts around of the openings 317 and 318 are in a bead shape.

The reinforcement sections 311 of the embodiment intersect with the width-wise center C1 of the bottom plate 310, and at least apart of each reinforcement section 311 is arranged obliquely with respect to the front-to-back direction of the vehicle seat 301 as an oblique line. However, such configuration is not limitative in any way, and the reinforcement sections 311 may be arranged in the front-to-back direction and in the left-to-right direction of the bottom plate 310, for example.

Next, the cushion material 320 will be described in detail. As shown in FIG. 20, the cushion material 320 includes concave sections 321 as spaces. Since a porous material such as urethane foam as described above is used for the cushion material 320, the cushion material 320 includes countless small pores which are generated due to foaming in the manufacturing process. The concave sections 321 are different from the countless small pores. They are not in micro sizes and they are formed intentionally in the cushion material 320.

The concave sections 321 are formed at the back side of the cushion material 320 and are opened toward the bottom plate 310.

The cushion material 320 is provided with a plurality of concave sections 321. By the concave sections 321 being formed in the cushion material 320, the cushion material 320 can easily bend toward the bottom plate 310 when a passenger sits on the vehicle seat 301. The parts between the individual concave sections 321 that are not recessed are wall sections 327.

Each concave section 321 is formed in a shape that the size gradually becomes smaller as approaching the upper side from the lower side. In particular, inside of each concave section 321 is a concave curved surface which is recessed upward from the reference surface 320a of the cushion material 320. In such way, the concave sections 321 are in a dome shape. Since all of the plurality of concave sections 321 are formed in such way, the cushion material 320 can bend easily when a load is applied near the concave sections 321. Further, there is an advantage that the cushion material 320 can be taken out easily from a mold which is in a contrasting shape of the concave sections 321 when forming the cushion material 320.

The shape of the openings at the lower ends of the concave sections 321 is a circle shape as shown in FIG. 17. Here, the shape of the openings of the concave sections 321 is not limited to a circle shape and may be an oval shape.

The plurality of concave sections 321 are arranged along the front-to-back direction of the cushion material 320 on the width-wise center C3 of the cushion material 320.

That is, the width-wise center C3 of the cushion material 320 is the part where the load of a passenger is likely to be applied. Such width-wise center C3 of the cushion material 320 where the load is likely to be applied can be made to bend easily in the front-to-back direction of the cushion material 320 by the plurality of concave sections 321 which are arranged in a line.

As described above, since the plurality of mounting sections 312 which are to be fixed to the vehicle body 302 are provided, along the inner periphery on the back side of the bottom plate 310 with spaces therebetween, rigidity of the bottom plate 310 itself can be improved. A plurality of other concave sections 321 are formed in the cushion material 320 at between the section corresponding to the positions of the plurality of mounting sections 312 and the plurality of concave sections 321 arranged along the width-wise center C3 of the cushion material 320. That is, the plurality of concave sections 321 can be formed in the cushion material 321 within the range corresponding to where rigidity of the bottom plate 310 is increased by the plurality of mounting sections 312. Therefore, while stably supporting the cushion material 320 by the bottom plate 310, bending of the cushion material 320 can be improved even more.

In FIG. 24, a plurality of mounting section corresponding parts 322 are shown as the parts corresponding to the plurality of mounting sections 312 in the cushion material 320.

As described above, the upper surface of the bottom plate 310 and the under surface of the cushion material 320 are the reference surfaces 310a and 320a, respectively. Since the plurality of concave sections 321 are formed on the under surface of the cushion material 320, the surface excluding the plurality of concave sections 321 is the reference surface 320a. Therefore, even if the plurality of concave sections 321 are formed at the back side of the cushion material 320, the bottom plate 310 can easily support the cushion material 320.

Figure 34:
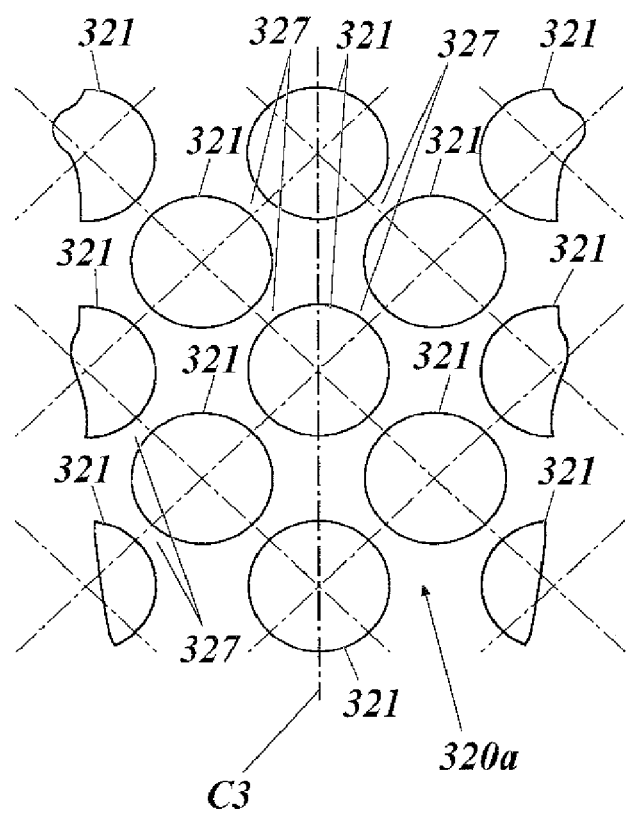
FIG. 34 is a diagram for explaining an arrangement of concave sections in the cushion material according to the second embodiment.

As shown in FIGS. 24 and 34, the plurality of concave sections 321 are arranged in a grid pattern via the wall sections 327. Further, the plurality of concave sections 321 arranged in a grid pattern are arranged in diagonal directions with respect to the front-to-back direction of the cushion material 320.

In such way, since the plurality of concave sections 321 are arranged in a grid pattern, the plurality of concave sections 321 can be lined neatly and efficiently within the back side range of the cushion material 320 and a great number of concave sections 321 can be formed. Moreover, even if the plurality of concave sections 321 which are arranged in a grid pattern are arranged in diagonal directions with respect to the front-to-back direction of the cushion material 320, the plurality of concave sections 321 can be lined neatly and efficiently within the back side range of the cushion material 320. Therefore, a great number of concave sections 321 can be formed.

Since the concave sections 321 are arranged in diagonal directions, with respect to two rows of the plurality of concave sections 321 wherein the concave sections are adjacent to each other in their front and back, the positions of the plurality of concave sections 321 in one row and the positions of the plurality of concave sections 321 in the other row can be shifted in the left and right. In other words, the plurality of concave sections 321 can be arranged in a zigzag pattern. Thereby, for example, the bending degree of the cushion material 320 can be improved by making the size of the plurality of concave sections 321 be larger. Further, even more concave sections 321 can be arranged densely by making the plurality of concave sections 321 be closer to each other.

Figure 35:
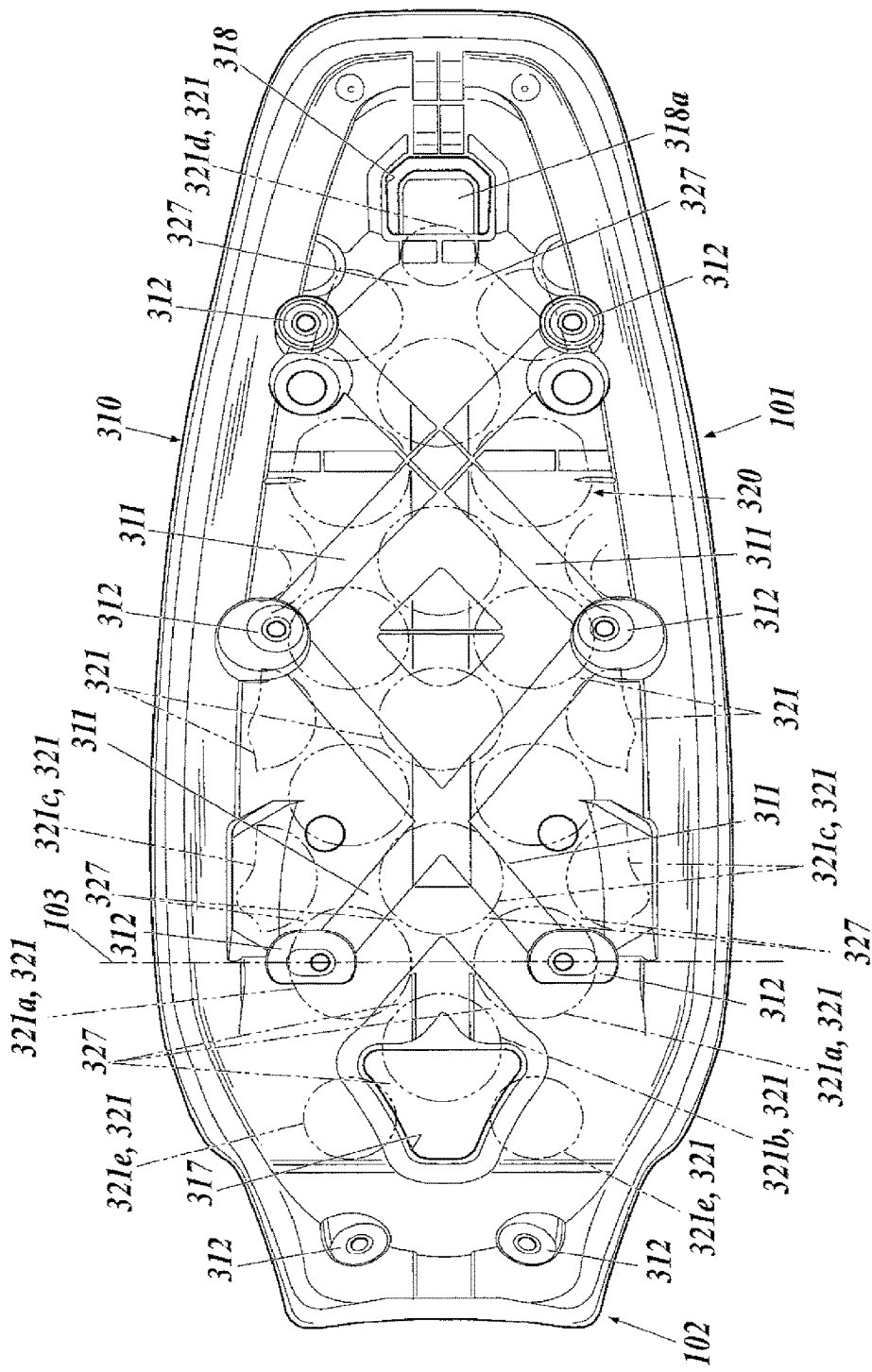
FIG. 35 is a diagram for explaining a positional relation between individual parts of the bottom plate and the concave sections according to the second embodiment.

As shown in FIG. 35, concave sections 321a are provided at the part corresponding to the bent section 103 of the bottom plate 310. In FIG. 35, the bent section 103 is shown in a two-dot chain line for convenience sake. However, the bent section 103 has a region of a certain extent. Although a case where two concave sections 321a are provided at the part corresponding to the bent section 103 is described in the present invention, it is sufficient that at least one concave section 321a is provided at the section. Further, it is preferred that the deepest point of the concave curved surface of each concave section 321, i.e. the inner apex thereof, is to be arranged on the bent section 103. The two concave sections 321a which are provided at the part corresponding to the bent section 103 overlap with the two ends of the top view V shaped bead (reinforcement sections 311, 311).

The ischium of a passenger is likely to be positioned on the bent section 103. Therefore, the two concave sections 321a provided at the part corresponding to the bent section 103 face the ischium of the passenger.

Further, concave sections 321b and 321c are provided in the front of and behind the concave sections 321a provided at the part corresponding to the bent section 103 with wall section 327 therebetween. One front side concave section 321*b* is arranged in the front of and between the two concave sections 321*a*. Three rear side concave sections 321*c* are arranged behind and between the two concave sections 321*a*.

The concave section 321*b* and the concave section 321*d* are provided at the parts corresponding to the openings 317 and 318 of the bottom plate 310, respectively. In particular, the concave section 321*b* is provided at the part corresponding to the front side opening 317 of the bottom plate 310. Approximately front half of the concave section 321*b* overlaps with the opening 317. The concave sections 321*e* and 321*c* are provided in the front of and behind the concave section 321*b* with wall sections 327 therebetween. The periphery of the opening 317 faces the wall sections 327.

On the other hand, the concave section 321*d* is provided at the part corresponding to the rear side opening 318 of the bottom plate 310. The back part of the concave section 321*d* overlaps with the opening 318.

Next, operation of the embodiment will be described.

Figure 36:
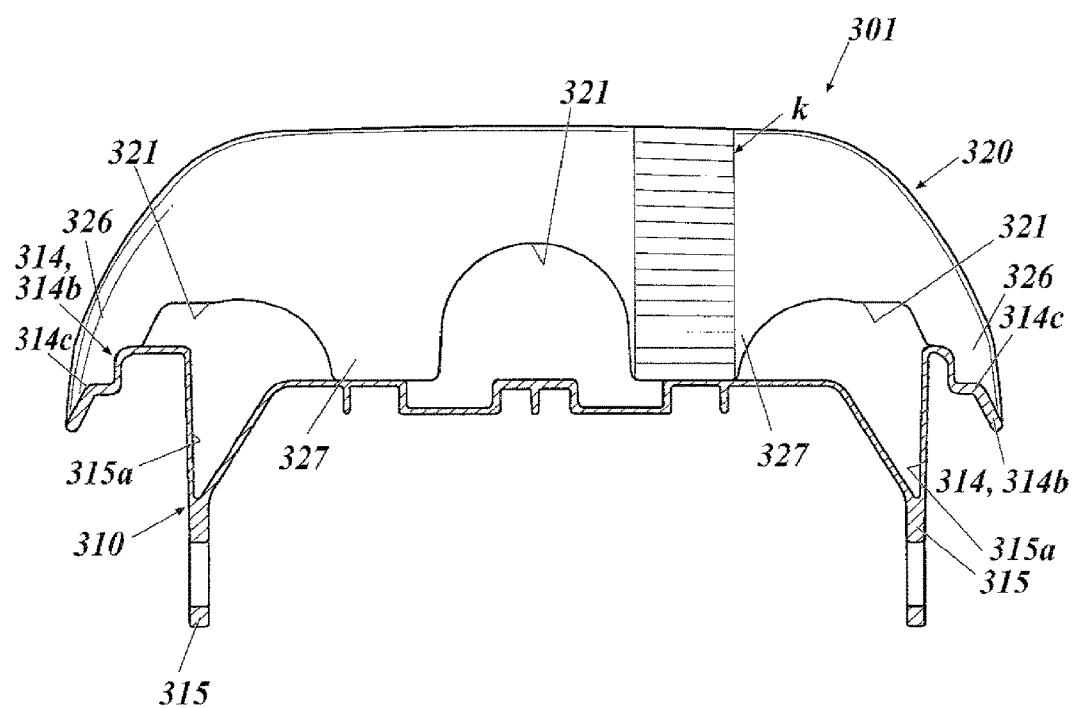
FIG. 36 is a diagram for explaining a state where the cushion material is not bent according to the second embodiment.

In FIG. 36, the grid section K shows the deformation level of individual layers in the cushion material 320. As shown in FIG. 36, the cushion material 320 is not bent before a passenger sits thereon, and the layers in the grid section K maintain the normal state where the individual layers are in the same size.

Figure 37:
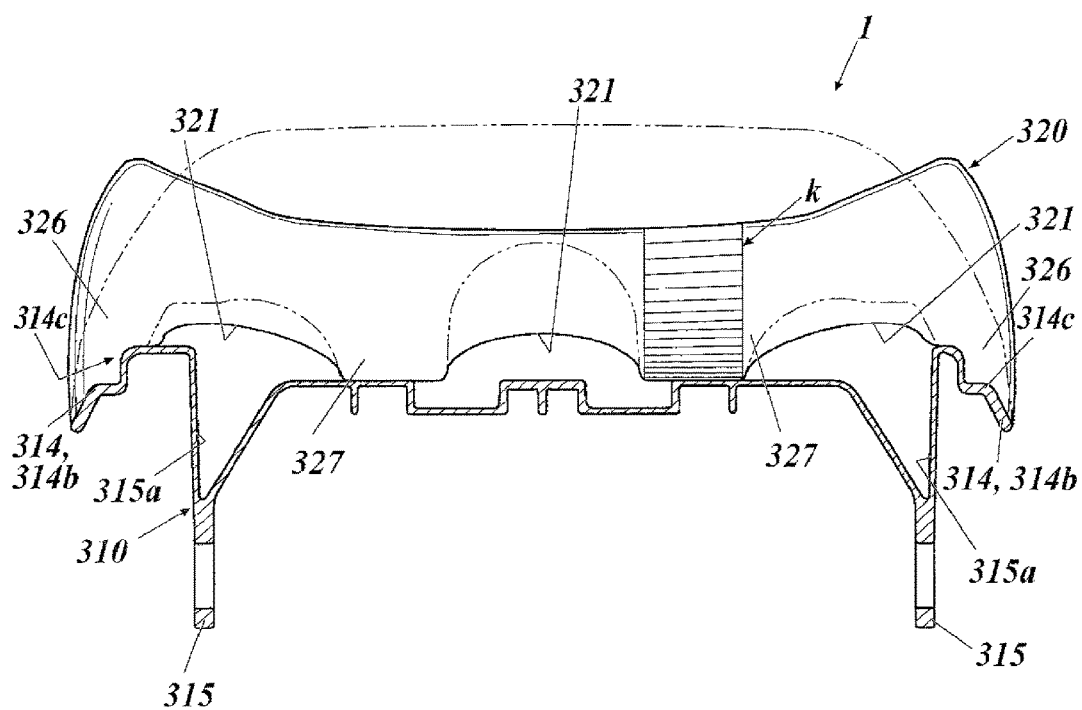
FIG. 37 is a diagram for explaining a state where the cushion material is bent according to the second embodiment.

In FIG. 37, the two-dot chain line shows the cushion material 320 before a passenger sits thereon. When the cushion material 320 bends due to a passenger sitting thereon as shown in FIG. 37, as shown in the grid section K, the degree of bending becomes smaller as moving up to the upper layers from the lowest layer. Since stress concentrates at the wall sections 327 whose cross-section areas are small, the degree of bending is greater in the lowest layer comparing to the upper layers.

It has been said that, in general, a passenger can sit comfortably when he/she can feel the hardness to a certain extent in a vehicle seat of a two wheeled vehicle or the like. Therefore, if the cushion material 320 is formed so as to bend at a part other than the upper layers thereof, the cushion material 320 is not likely to bend in the upper layers thereof and the passenger can feel a certain level of hardness. On the other hand, since a part other than the upper layers of the cushion material 320 is more likely to bend comparing to the upper layers, this part can absorb the vibration and the like caused by the unevenness of the road surface. Therefore, even if the cushion material 320 is made thinner and the vehicle seat is made lighter, a stable sitting can be maintained.

Since the cushion material 320 is formed so that it bends at the lowest layer part thereof, the bending is to start at the lowest layer part that is most distanced from the upper layer part. Therefore, the upper layer part can be inhibited from deforming with the bending of the lowest layer part, and the comfortable sitting can be prevented from becoming uncomfortable due to bending.

Since the plurality of concave sections (space sections) 321, each of which has a shape that becomes smaller as approaching the upper section thereof from the lower section thereof, are formed in the cushion material 320, the lowest layer part of the cushion material 320 being the lower ends of the concave sections 321, the cross-section area of the lowest layer part is smaller than the cross-section area of the upper layer part. Thereby, stress is concentrated at the lowest layer part, and thus, the lowest layer part is even more likely to bend.

Since the cushion material 320 has hollow spaces therein by forming the concave sections 321, the cushion material 320 can be made lighter.

Moreover, since the lower ends of the concave sections 321 are opened, they can deform in their circumferential direction with increased degree of freedom and the lowest layer part can bend even more.

Since the shape of the opening sections of the concave sections 321 is a circle shape or an oval shape, stress can be dispersed more comparing to a case where corners are formed, at the rims of the opening sections, and thus, breaking can be prevented.

Since the inner surfaces of the concave sections 321 are concave curved surfaces which are recessed upward, stress can be dispersed due to the inner surfaces of the concave sections 321 being curved surfaces, and thus, breaking can be prevented.

The bent section 103 between the main surface section 101 and the sub surface section 102 of the bottom plate 310 is where the buttocks of a passenger are to be placed in most cases. That is, the passenger can sit more comfortably if the cushioning properties at this section are improved. Further, if at least one concave section 321*a* is formed at the bent section 103 in the cushion material 320 as described above, the cushioning properties can be ensured by the concave section 321*a* even if the cushion material 320 is made thin, and thus, a stable sitting can be maintained.

Since the concave section 321*a* is formed at the part corresponding to the ischium of the passenger who sits on the bent section 103, the cushioning properties with respect to the ischium of the passenger can be ensured, and thus, the passenger can sit more comfortably.

Since the space sections 321*b* and 321*c* are also provided in the front of and behind the concave section 321*a* at the part corresponding to the bent section 103, even higher cushioning properties can be ensured. Further, since the wall sections 327 are provided between the concave sections 321*a*, 321*b* and 321*c*, the wall sections 237 regulates excess bending of the cushion material 320, and thus, a stable cushioning properties can be ensured.

Since the inner surface of the concave section 321*a* at the part corresponding to the bent section 103 is a concave curved surface that is recessed upward and the deepest point of the concave curved surface is arranged on the bent section 103, stress due to a passenger sitting on the bent section 103 can be dispersed efficiently.

Since the wall sections 105, 105 that extend vertically are formed along the front-to-back direction so as to face each other at the left side and the right side of the bottom plate 310 on the bent section 103, rigidity at the bent section 103 in the front-to-back direction can be improved by the wall sections 105, 105. If rigidity in the front-to-back direction of the bent section 103 is improved, twisting of the bottom plate 310 can be prevented, and thus, more comfortable sitting can be provided.

Since the rib 104 that extends from the left to right is provided on the back side between the left and right mounting sections 312, 312 of the second row and the top view V shape bead (reinforcement sections 311, 311) is arranged on the upper side, rigidity of the left and right mounting sections 312, 312 can be improved, and thus, stability in attachment to the vehicle body can be improved.

Since the top view V shaped bead (reinforcement sections 311, 311) is arranged so as to overlap with the concave sections 321*a* at the part corresponding to the bent section 103 of the cushion material 320, the bead guides the entering and exiting of the air in the concave sections 321 caused by the bending of the cushion material 320, and thus, the cushion material 320 can bend smoothly.

The parts near the openings 317 and 318 in the bottom plate 310 are the parts not directly relevant to supporting of the vehicle seat 301. Therefore, as described above, even if the concave sections 321b and 321d are formed at the positions facing the openings 317 and 318 in the cushion material 320, stability of the vehicle seat 301 is maintained, and thus, a stable sitting can also be maintained.

Since the concave sections 321e and 321a are also provided in the front of and behind the concave section 321b which is at the position facing the opening 317, the plurality of concave sections 321a, 321b and 321e can be arranged near the opening 317 which is not directly relevant to supporting the vehicle seat 1, and thus, the cushion material 320 can be made even more lighter.

Since the wall sections 327 between the plurality of concave sections 321 face the periphery of the opening 317, the periphery of the opening 317 is to be supported by the wall sections 327, and thus, stability of the periphery of the opening 317 can be ensured.

Since the periphery of the opening 317 and the periphery of the opening 318 in the bottom plate 310 are formed in a bead shape by the concave sections 319a and 319c, rigidity at the periphery of the opening 317 and the periphery of the opening 318 can be improved, and thus, stability at the periphery of the opening 317 and the periphery of the opening 318 can be ensured.

At a predetermined section of the cushion material 320, it is assumed that the reference surface 320a of the cushion material 320 is arranged at the position vertically facing the reinforcement sections 311 of the bottom plate 310.

Thereby, when the cushion material 320 bends, the reference surface 320a can be made to sink more downward by using the difference in level formed by the reinforcement sections 311, i.e. the turning sections 311a and the wall sections 311b of the reinforcement sections 311. Therefore, the cushion material 320 can bend easily.

That is, not only the reference surface 310a of the bottom plate 310 and the reference surface 320a of the cushion material 320 are tightly in contact with each other, the reference surface 320a partially sinks toward the recesses of the cross-section concaved reinforcement sections 311. Therefore, the cushion material 320 can be prevented from having trouble bending.

With respect to the bottom plate 310 and the cushion material 320, even if the bottom plate 310 is provided with the plurality of reinforcement sections 311 and also even if the cushion material 320 is provided with the plurality of concave sections 321, basically, the reference surfaces 310a and 320a are in contact with each other. Therefore, the degree of bending of the cushion material 320 is uniform overall.

As shown in FIGS. 24, 29 to 32, the cushion material 320 includes edge concave sections 325, 325 which are arranged near the two side edges of the cushion material 320, respectively, and which are to be arranged above the main reinforcement section 314a of the bottom plate 310. Spaces are formed between these edge concave sections 325, 325 and the main reinforcement section 314a.

Each of the edge concave sections 325, 325 includes ribs 325a which are formed at a plurality of points along the front-to-back direction of the vehicle seat 301.

With such edge concave sections 325, 325, the cushion material 320 can be made lighter. When the vehicle seat 301 is to be used as a two-seater, since the parts corresponding to the edge concave sections 325, 325 are likely to bend, sitting properties thereof, including a case where the vehicle seat 301 is used as a two-seater, can be improved.

With respect to the plurality of ribs 325a, the under surfaces thereof are in contact with the upper surface of the main reinforcement section 314a. Therefore, the load of a passenger who sits behind the passenger who drives the automatic two wheeled vehicle can be supported easily.

Further, as shown in FIGS. 22 to 33, the cushion material 320 includes an abutting step section 326 which is provided around the entire periphery edge of the cushion material 320 and which abuts the upper side of the step section 314b of the bottom plate 310. That is, the abutting step section 326 is formed so as to correspond to the shape of the upper side of the step section 314b and is tightly in contact with the step section 314b.

By the step section 314b and the abutting step section 326 being in contact with each other, the entire periphery edge of the bottom plate 310 and the entire periphery edge of the cushion material 320 are in a unified state. Therefore, when folding the edge 303a of the surface material 303 in to the back side of the bottom plate 310 and fixating the edge 303a thereto, the surface material 303 can easily cover the edge of the bottom plate 310 and the edge of the cushion material 320.

Since a porous material such as urethane foam is used for the cushion material 320 as described above, the air goes through, enters and exits, the micro pores of the cushion material 320 when the cushion material bends and recovers from the bent state. Further, as described above, the reference surface 310a of the bottom plate 310 where the plurality of reinforcement sections 311 are formed and the reference surface 320a of the cushion material 320 wherein the plurality of concave sections 321 are formed are in contact with each other.

Therefore, one concave section 321 of the plurality of concave sections 321 and another concave section 321 which is different from the one concave section 321 are in communication with each other through the reinforcement section 311 formed so as to be recessed at the upper side of the bottom plate 310. Thereby, when the cushion material 320 bends, the air can be let out to another concave section 321 from the one concave section 321 through the reinforcement sections 311. Therefore, the cushion material 320 can bend more easily.

Since the cushion material 320 is supported by the upper surface of the bottom plate 310 and is covered with the surface material 303, there may be a case where the air flow is blocked. In order to control this, the opening 317 is formed in the bottom plate 310 as an air passage.

According to the embodiment, since the cushion material 320 is provided with the concave sections 321, the cushion material 320 can be made lighter even without making the cushion material 320 be thinner as in a conventional case. Thereby, while maintaining a stable sitting, the vehicle seat 301 can be made lighter. Further, since a plurality of concave sections 321 are formed in the cushion material 320, the cushion material 320 can bend more easily.

In the embodiment, an example of a case where a plurality of concave sections 321 are formed on the underside of the cushion material 320 in order to make the cushion material 320 bend at the part other than its upper layer part is described above. However, as long as the cushion material 320 bends at a part other than its upper layer part, a cushion material of a form other than the above described form can be applied.

For example, a cushion material made of a soft foam material such as urethane foam, polypropylene foam, polyethylene foam, etc. has a tendency to bend at the high density part, in general. Therefore, if the density at the lowest layer part of the cushion material is made to be the densest, the cushion material can be formed so as to bend at the lowest layer part even if the concave sections 321 are not formed. That is, a cushion material that bends at the lowest layer part can be realized without considering its shape and the like.

With respect to the cushion material 320 having the concave sections 321, if the density at the lowest layer part is made to be the densest, the cushion material 320 is more likely to bend at the lowest layer part thereof and the cushioning properties can be improved.

In the above embodiment, an example of a case where the space sections of the present invention are the concave sections 321 opened at the lower parts thereof is described. However, the space sections themselves may be closed. For example, when forming a cushion material with a soft foam material, closed space sections may be formed by forcing the air to be injected before the soft foam material becomes solidified.

Figure 42:
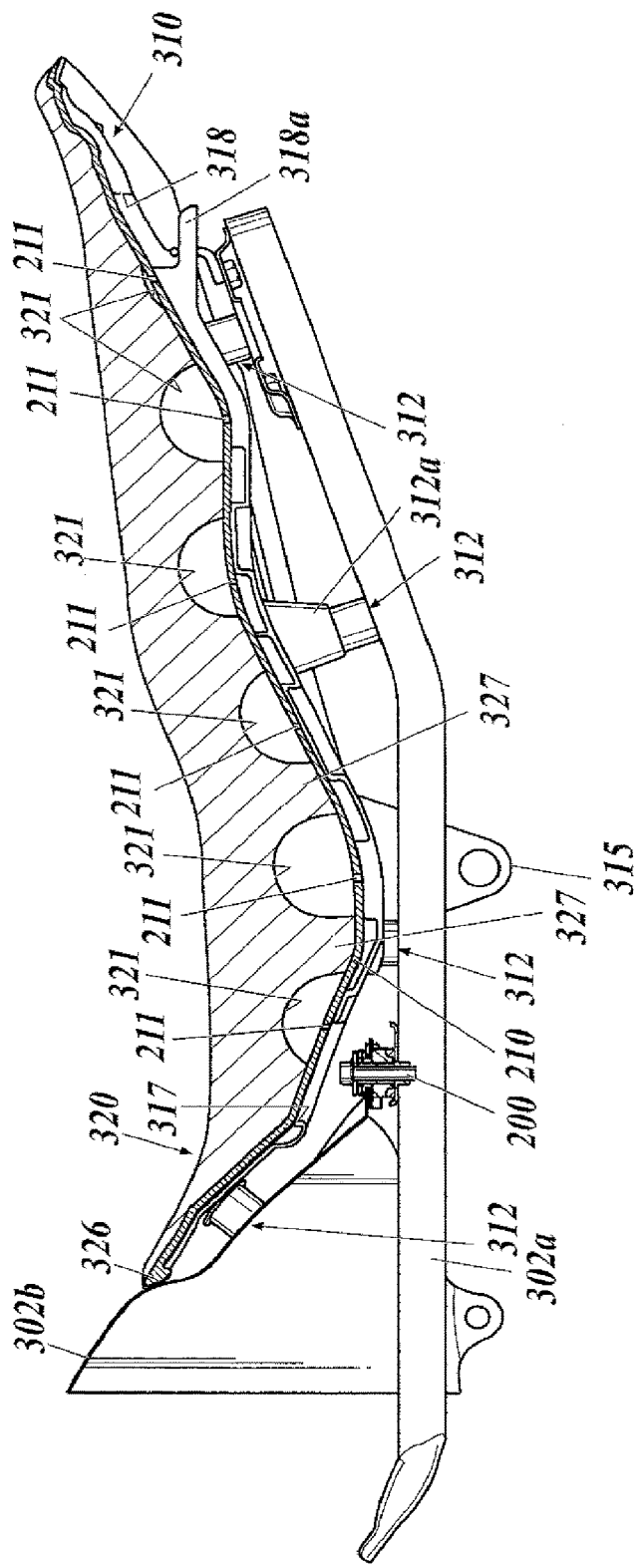
FIG. 42 is a side cross-sectional view showing a modification example of the cushion material according to the second embodiment.

As shown in FIG. 42, the lower ends of the concave sections 321 may be closed by attaching a laminate member 210 across the entire under surface of the cushion material 320. The laminate member 210 is a plate-like member of resin, and air holes 211 to ensure air passage from inside the concave sections 321 are formed at the parts corresponding to the concave sections 321.

Since the laminate member 210 is layered across the entire under surface of the cushion material 320, the lower parts of the concave sections 321 are closed. Therefore, the air inside the concave sections 321 can be maintained and a stable cushioning properties can be ensured.

Further, since the air holes 211 which ensures air passage from the concave sections 321 are formed in the laminate member 210, small amount of air enters to and exits from the concave sections 321 through the air holes 211 according to bending of the cushion material 320. If the concave sections 321 are completely closed, there is a possibility that bending of the cushion material 320 is inhibited due to the air in the concave sections 321. However, if small amount of air enters to and exits from the concave sections 321 through the air holes 211, the cushion material 320 can bend smoothly while stable cushioning properties are ensured.

INDUSTRIAL APPLICABILITY

The bottom plate structure of the vehicle seat according to the embodiment can be used in a vehicle seat which is to be mounted on a two wheeled vehicle or the like, for example.

DESCRIPTION OF SYMBOLS 1 vehicle seat
1a lowest position
2 vehicle body
2a seat rail
3 surface material
3a edge
4 staple
10 bottom plate
11 reinforcement section
11a turning section
11b wall section
11c bottom
12 mounting section
12a leg section
13 intersection
13a reinforcement rib
14 rim reinforcement section
14a main reinforcement section
14b step section
14c bent section
18 engaging section
18a claw section
20 cushion material
21 concave section
22 mounting section corresponding part
23 expected ischium section
24 insertion section
25 edge concave section
26 abutting step section

The invention claimed is:

1. A cushion material structure of a vehicle seat, comprising:
a cushion material having concave sections each formed at a back side of the cushion material,
wherein:
the cushion material is supported by an upper surface of a bottom plate that is provided on a vehicle body, wherein each concave section is opened toward the bottom plate,
the bottom plate includes at least one reinforcement section that bulges at a back side of the bottom plate and that is recessed at an upper side of the bottom plate,
an under surface of the cushion material is in contact with the bottom plate at one edge of an opening of at least one of the concave sections and is separate from the bottom plate at an opposite edge of the opening of the at least one of the concave sections,
the at least one reinforcement section is arranged so as to be opposed to at least one of the concave sections,
a central concave section that is the concave section in a width-wise center of the cushion material is in contact with a portion of the bottom plate where the reinforcement section is not formed, and
a part of a periphery of an adjacent concave section that is the concave section adjacent to the central concave section is opposed to the reinforcement section, the part being on a side near to the central concave section.

2. A cushion material structure of a vehicle seat, comprising:
a cushion material having concave sections each formed at a back side of the cushion material,
wherein:
the cushion material is supported by an upper surface of a bottom plate that is provided on a vehicle body, wherein each concave section is opened toward the bottom plate,
the bottom plate includes at least one reinforcement section that bulges at a back side of the bottom plate and that is recessed at an upper side of the bottom plate,
the at least one reinforcement section is arranged such that at least a part of the at least one reinforcement section is opposed to at least one of the concave sections and such that the at least one reinforcement section is wider than the at least one of the concave sections,
the bottom plate comprises non-reinforcement sections where the reinforcement section is not formed, and the at least one reinforcement section and the non-reinforcement sections are alternately arranged such that each of the reinforcement section and the non-reinforcement sections is opposed to one of the concave sections.

3. A cushion material structure of a vehicle seat, comprising:
- a cushion material having concave sections each formed at a back side of the cushion material, wherein:
- the cushion material is supported by an upper surface of a bottom plate that is provided on a vehicle body, wherein each concave section is opened toward the bottom plate,
- the bottom plate includes at least one reinforcement section that bulges at a back side of the bottom plate and that is recessed at an upper side of the bottom plate,
- the at least one reinforcement section is arranged such that at least a part of the at least one reinforcement section is opposed to at least one of the concave sections and such that the at least one reinforcement section is wider than the at least one of the concave sections, and
- the bottom plate includes at least one opening that is opposed to the concave section of the cushion material.

* * * * *